US007758961B2

(12) United States Patent  (10) Patent No.: US 7,758,961 B2
Jones et al.  (45) Date of Patent: Jul. 20, 2010

(54) FUNCTIONALIZED NANOPARTICLES AND THEIR USE IN PARTICLE/BULK MATERIAL SYSTEMS

(75) Inventors: Jamie N. Jones, Evanston, IL (US); F. Brent Neal, Asheville, NC (US); Hao Zhou, Boiling Springs, SC (US); Philip Wilson, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 153 days.

(21) Appl. No.: 12/039,036

(22) Filed: Feb. 28, 2008

(65) Prior Publication Data

US 2008/0274356 A1 Nov. 6, 2008

Related U.S. Application Data

(63) Continuation-in-part of application No. 11/726,578, filed on Mar. 22, 2007.

(51) Int. Cl.
 *B32B 5/16* (2006.01)
(52) U.S. Cl. .................. 428/403; 428/323; 428/331; 428/407
(58) Field of Classification Search .......... 428/323, 428/331, 403, 407
See application file for complete search history.

(56) References Cited

U.S. PATENT DOCUMENTS

| 4,522,958 | A | | 6/1985 | Das et al. ................. 523/212 |
| 4,690,868 | A | | 9/1987 | Rice ......................... 428/409 |
| 4,715,986 | A | * | 12/1987 | Gruning et al. ............ 516/100 |
| 5,239,008 | A | | 8/1993 | Mudge et al. .............. 525/243 |
| 5,500,331 | A | | 3/1996 | Czekai et al. .............. 430/449 |
| 5,510,118 | A | | 4/1996 | Bosch et al. ............... 424/489 |
| 5,543,133 | A | | 8/1996 | Swanson et al. ........... 424/9.45 |
| 5,814,673 | A | | 9/1998 | Khait ......................... 521/40 |
| 5,863,647 | A | | 1/1999 | Yoneda et al. ............. 428/331 |
| 6,180,685 | B1 | | 1/2001 | Khait ......................... 521/40 |
| 6,245,865 | B1 | | 6/2001 | Lee et al. ..................... 526/65 |

(Continued)

FOREIGN PATENT DOCUMENTS

WO WO 02/088259 11/2002

(Continued)

OTHER PUBLICATIONS

Patent Cooperation Treaty PCT International Search Report. Date of mailing, Nov. 26, 2008. International Application No. PCT/US2008/003315.

*Primary Examiner*—H. (Holly) T Le
(74) *Attorney, Agent, or Firm*—Cheryl J. Brickey

(57) ABSTRACT

A process for creating readily or highly dispersible nanoparticles on which chemically reactive functional groups or ligands have been placed. An ultra-high shear fluidic processor is used to change the size distribution of nanoparticle agglomerations and facilitate the formation of stable dispersions of such nanoparticles, as well as the placement of various chemically reactive functional groups or ligands on exposed surface areas of such nanoparticles. Such functionalized nanoparticle agglomerations have a broader size distribution (with a substantial increase in the proportion of smaller agglomerations), can exhibit enhanced dispersion characteristics and, when dispersed in various bulk materials, can impart to such bulk materials the desirable physical or chemical properties associated with the selected chemically active functional groups that have been attached to the surface areas of such agglomerations.

10 Claims, 17 Drawing Sheets

U.S. PATENT DOCUMENTS

| | | | |
|---|---|---|---|
| 6,380,295 B1 | 4/2002 | Ross et al. | 524/443 |
| 6,479,003 B1 | 11/2002 | Furgiuele et al. | 264/176.1 |
| 6,494,390 B1 | 12/2002 | Khait et al. | 241/23 |
| 6,599,631 B2 | 7/2003 | Kambe et al. | 428/447 |
| 6,660,381 B2 * | 12/2003 | Halas et al. | 428/403 |
| 6,797,216 B2 | 9/2004 | Furgiuele et al. | 264/176.1 |
| 6,818,173 B1 | 11/2004 | Khait | 264/540 |
| 6,822,035 B2 | 11/2004 | Chaiko | 524/445 |
| 6,849,215 B2 | 2/2005 | Khait | 264/118 |
| 7,108,915 B2 * | 9/2006 | Adams et al. | 428/403 |
| 7,189,768 B2 | 3/2007 | Baran, Jr. et al. | 523/200 |
| 7,223,359 B2 | 5/2007 | Torkelson et al. | 264/211.21 |
| 7,507,530 B2 * | 3/2009 | Huang et al. | 435/6 |
| 7,560,160 B2 * | 7/2009 | Sudarshan et al. | 428/402 |
| 7,608,902 B2 * | 10/2009 | Kwon et al. | 257/428 |
| 2003/0027897 A1 * | 2/2003 | Mei et al. | 523/216 |
| 2003/0124050 A1 | 7/2003 | Yadav et al. | 423/592.1 |
| 2005/0077497 A1 | 4/2005 | Anderson | 252/299.1 |
| 2007/0020063 A1 * | 1/2007 | Thompson | 411/377 |
| 2007/0049659 A1 | 3/2007 | Quay | 423/592.1 |
| 2008/0274356 A1 * | 11/2008 | Jones et al. | 428/403 |
| 2009/0256116 A1 * | 10/2009 | Shumaker-Parry et al. | 252/301.18 |

FOREIGN PATENT DOCUMENTS

| | | |
|---|---|---|
| WO | WO 2006/083431 | 8/2006 |
| WO | WO 2007/020063 | 2/2007 |

* cited by examiner

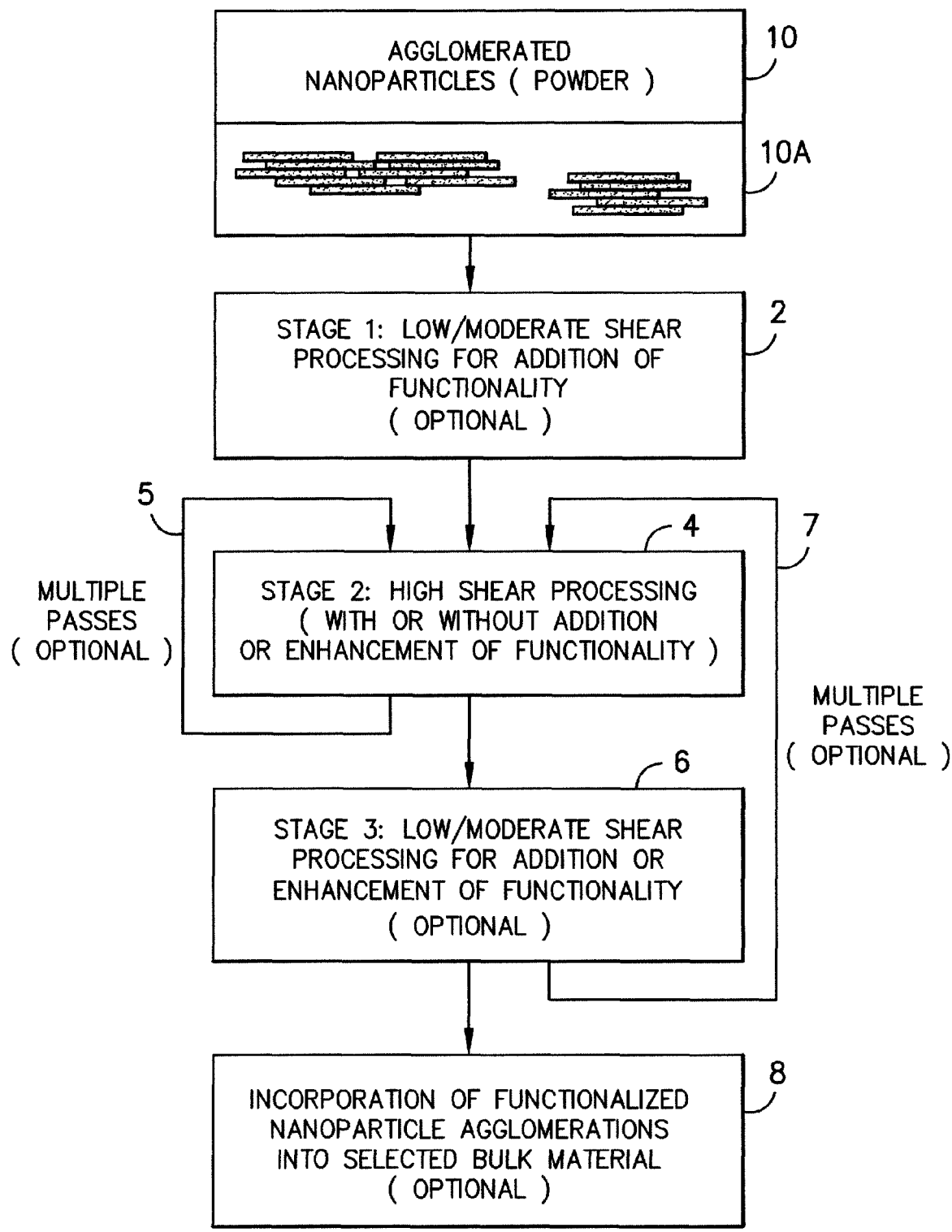
FIG. -1-

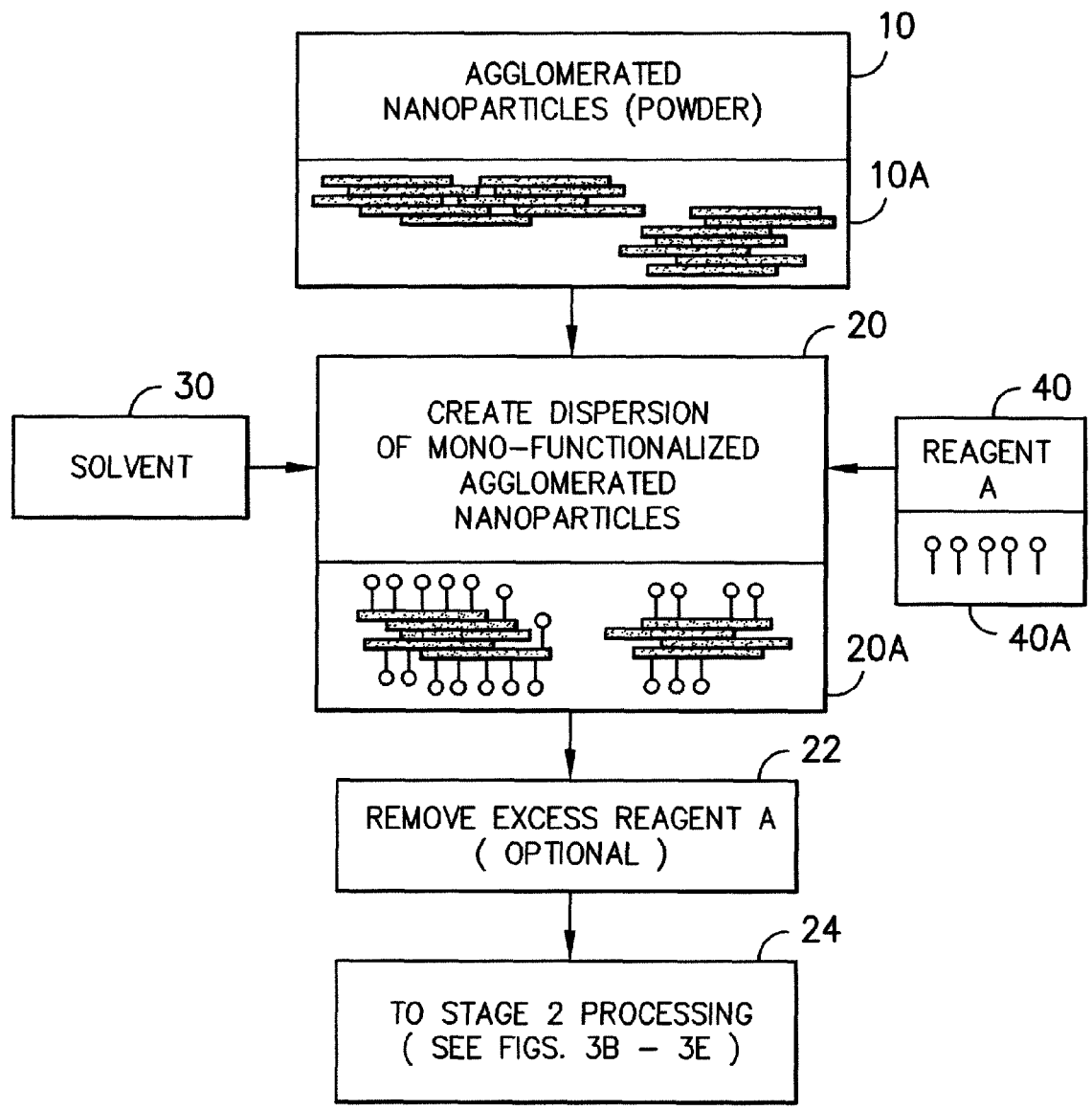
FIG. -2-

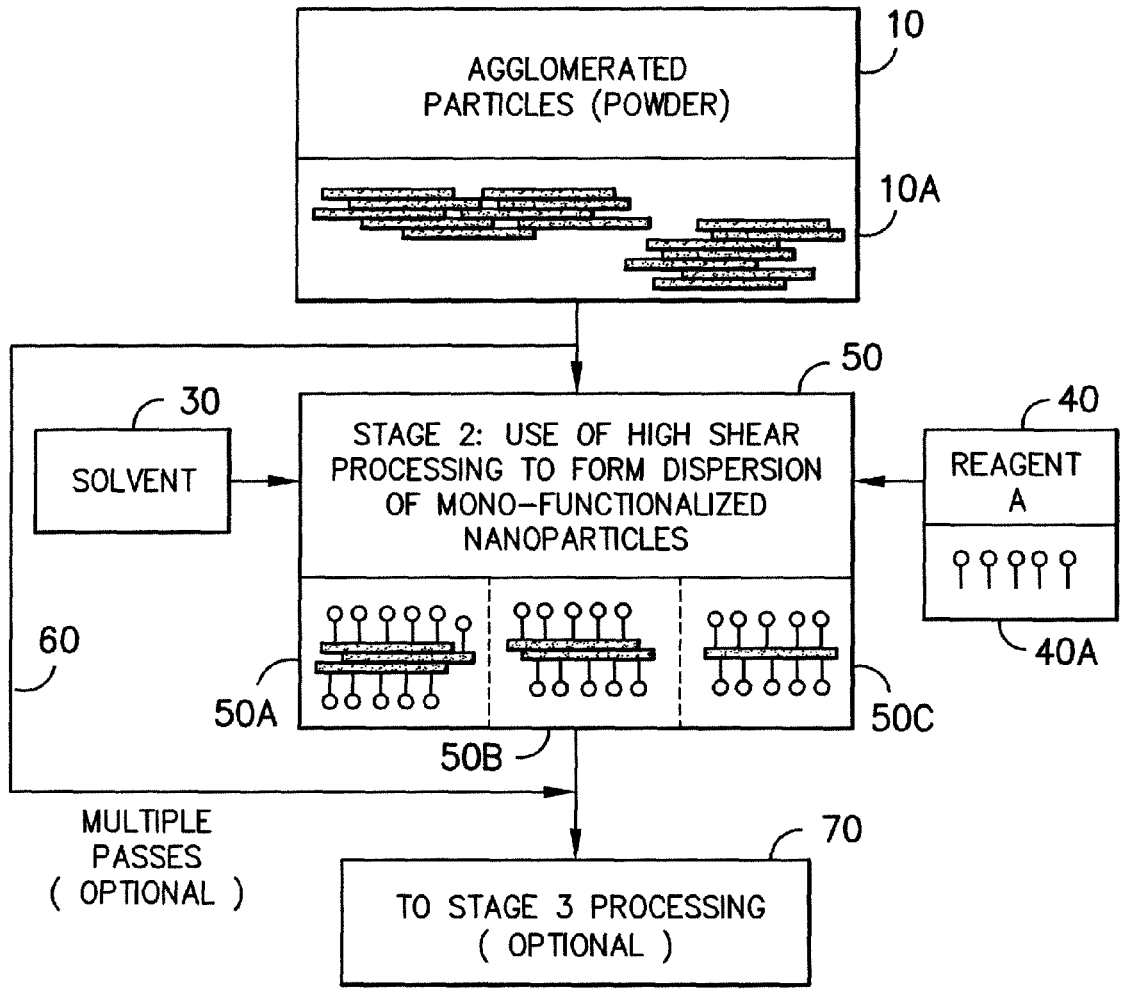
FIG. -3A-

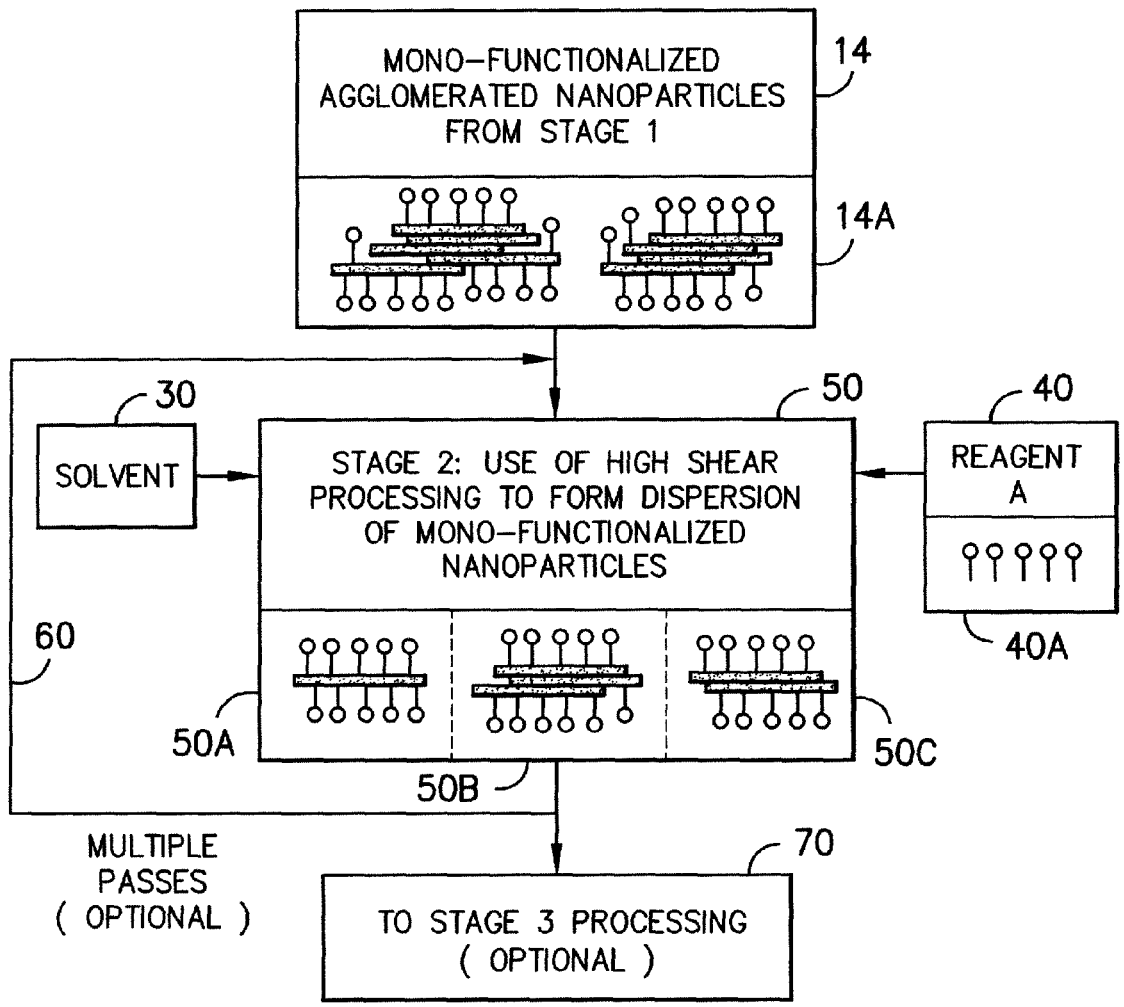
FIG. -3B-

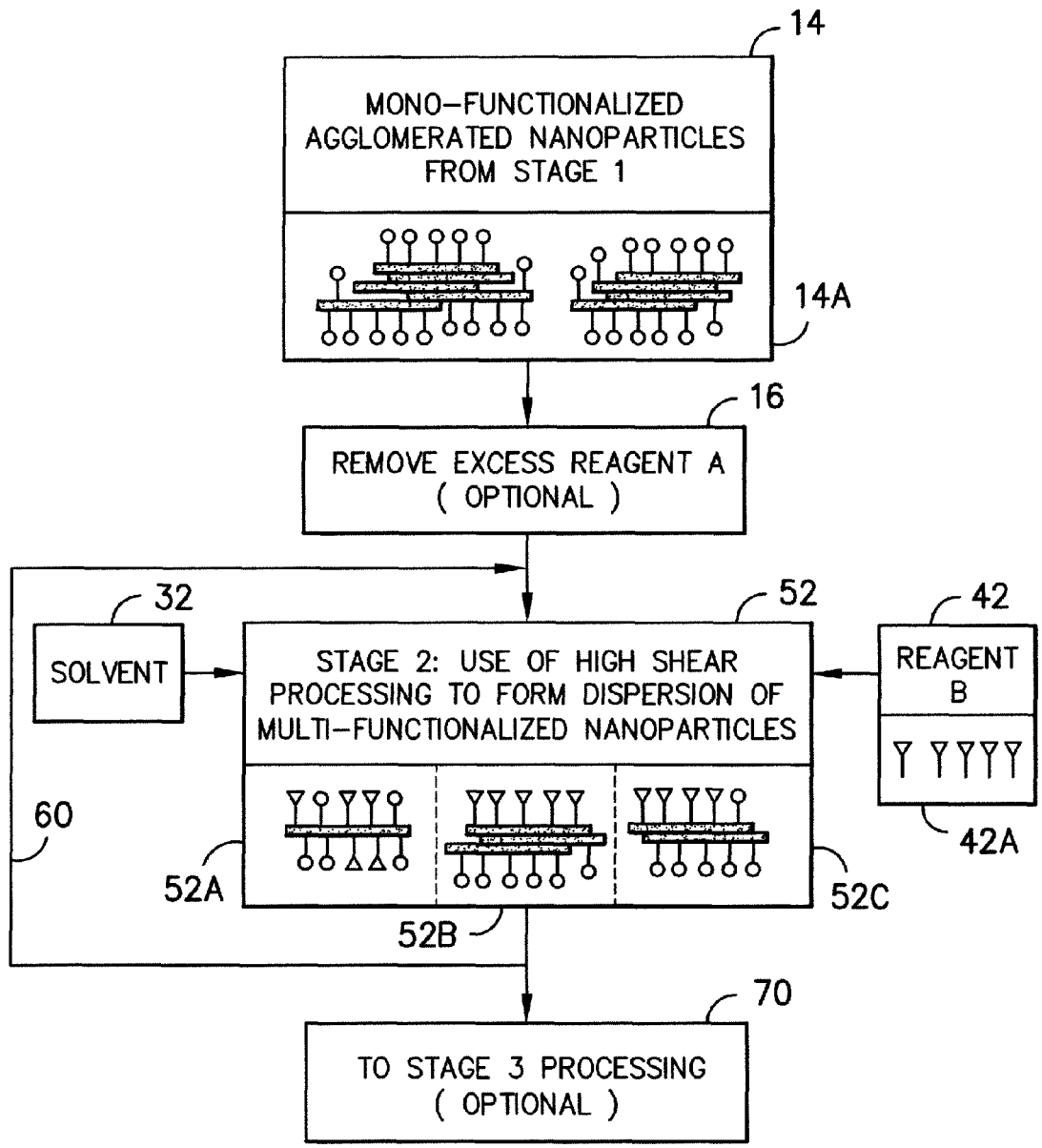
FIG. -3C-

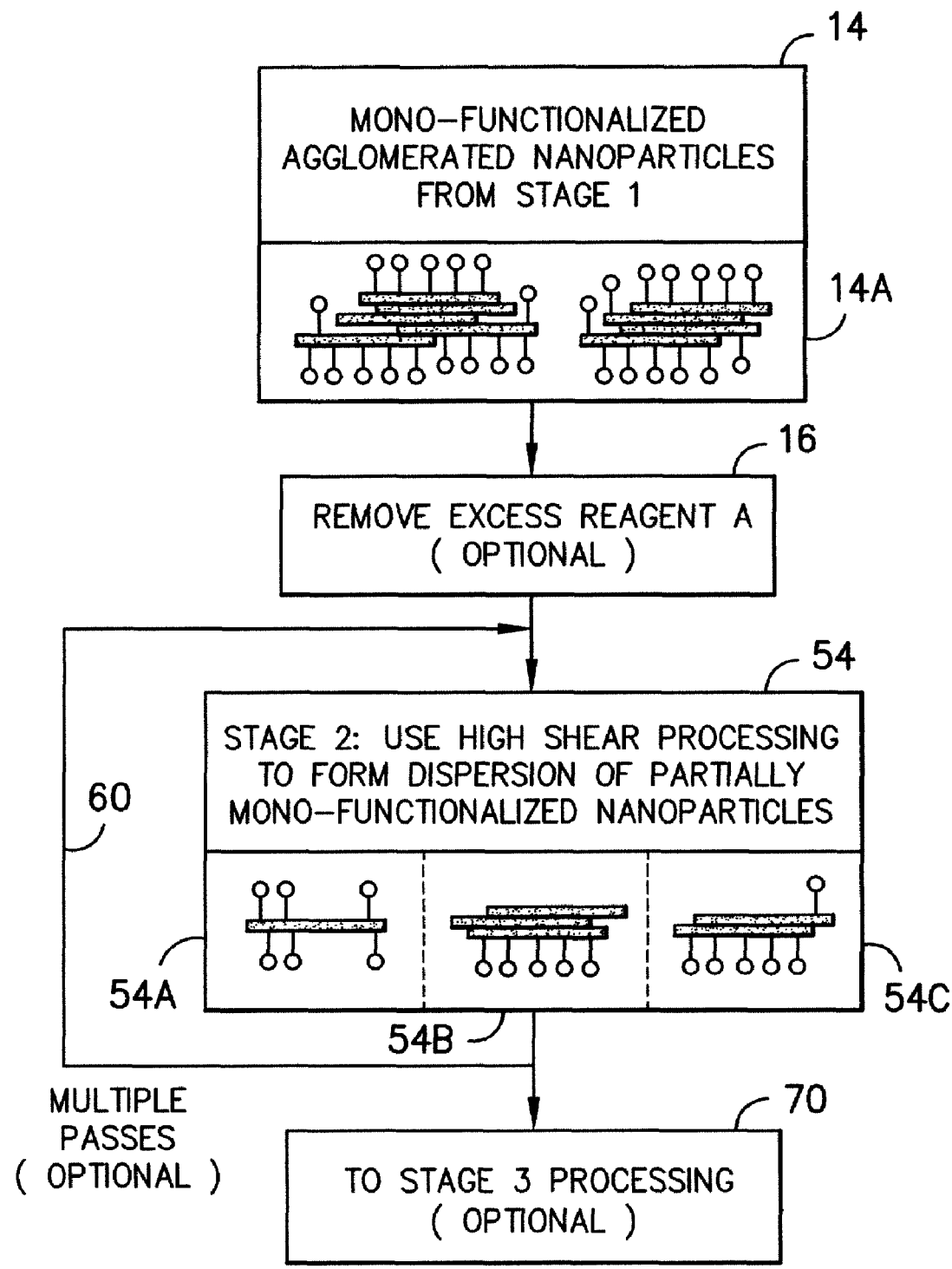
FIG. —3D—

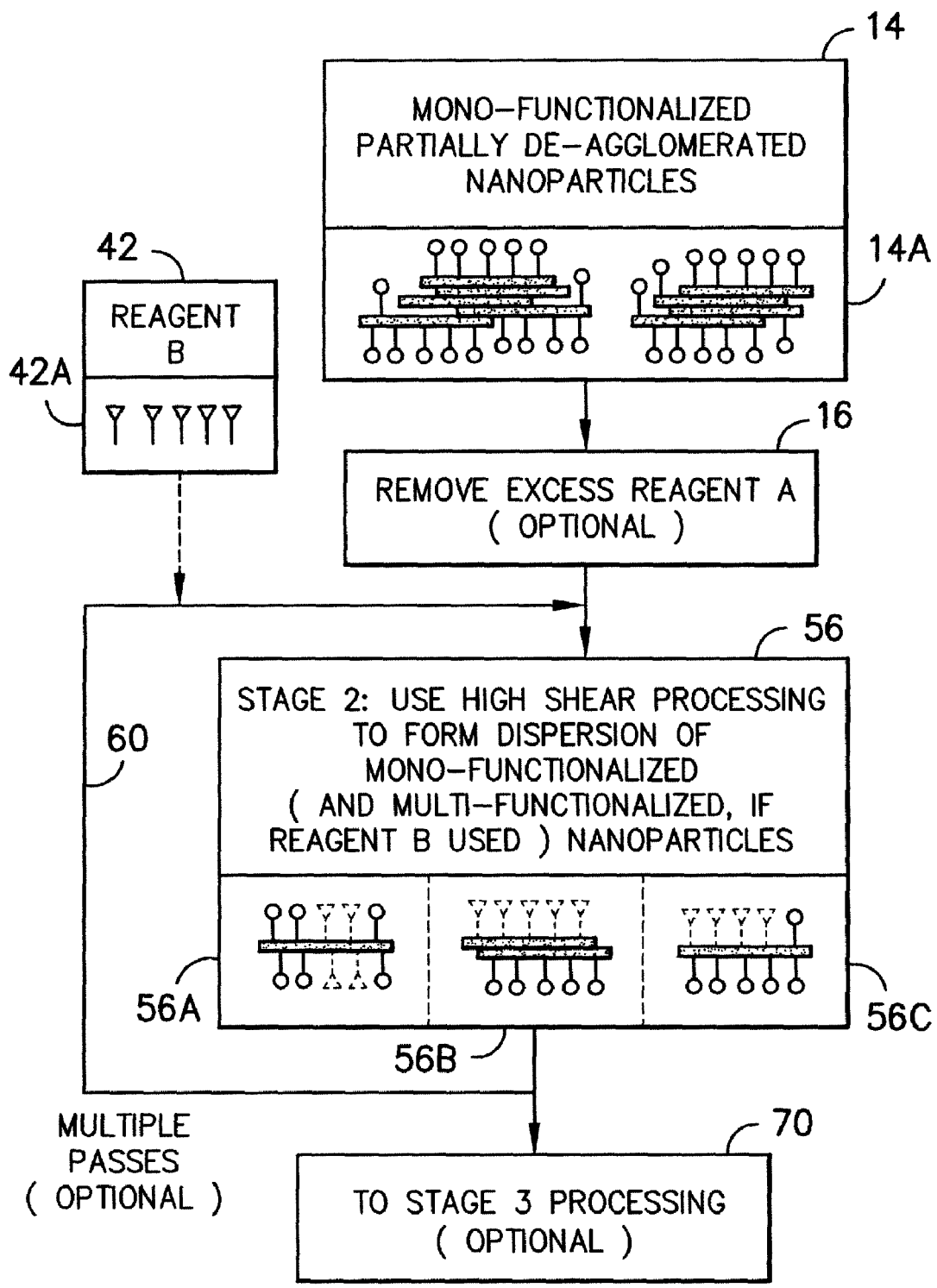
FIG. —3E—

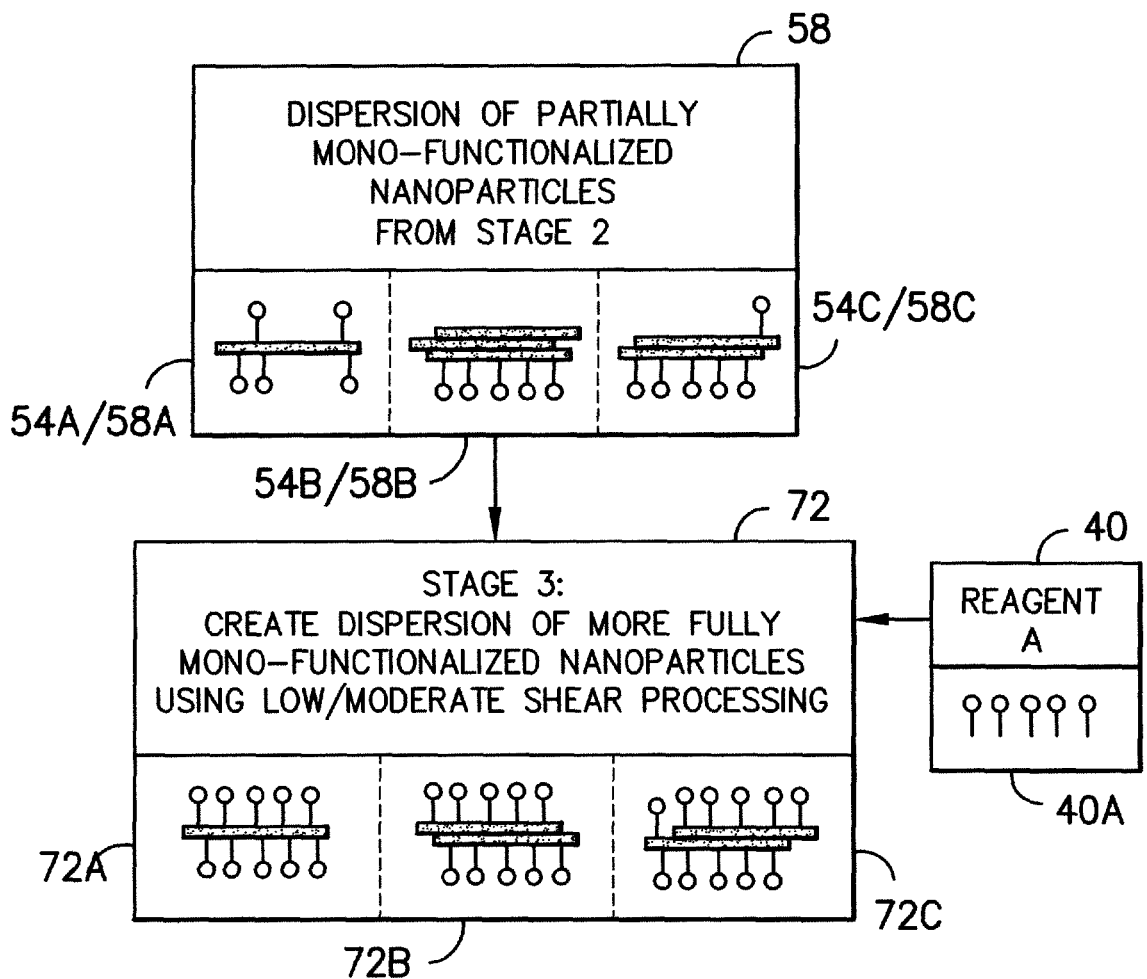
FIG. —4A—

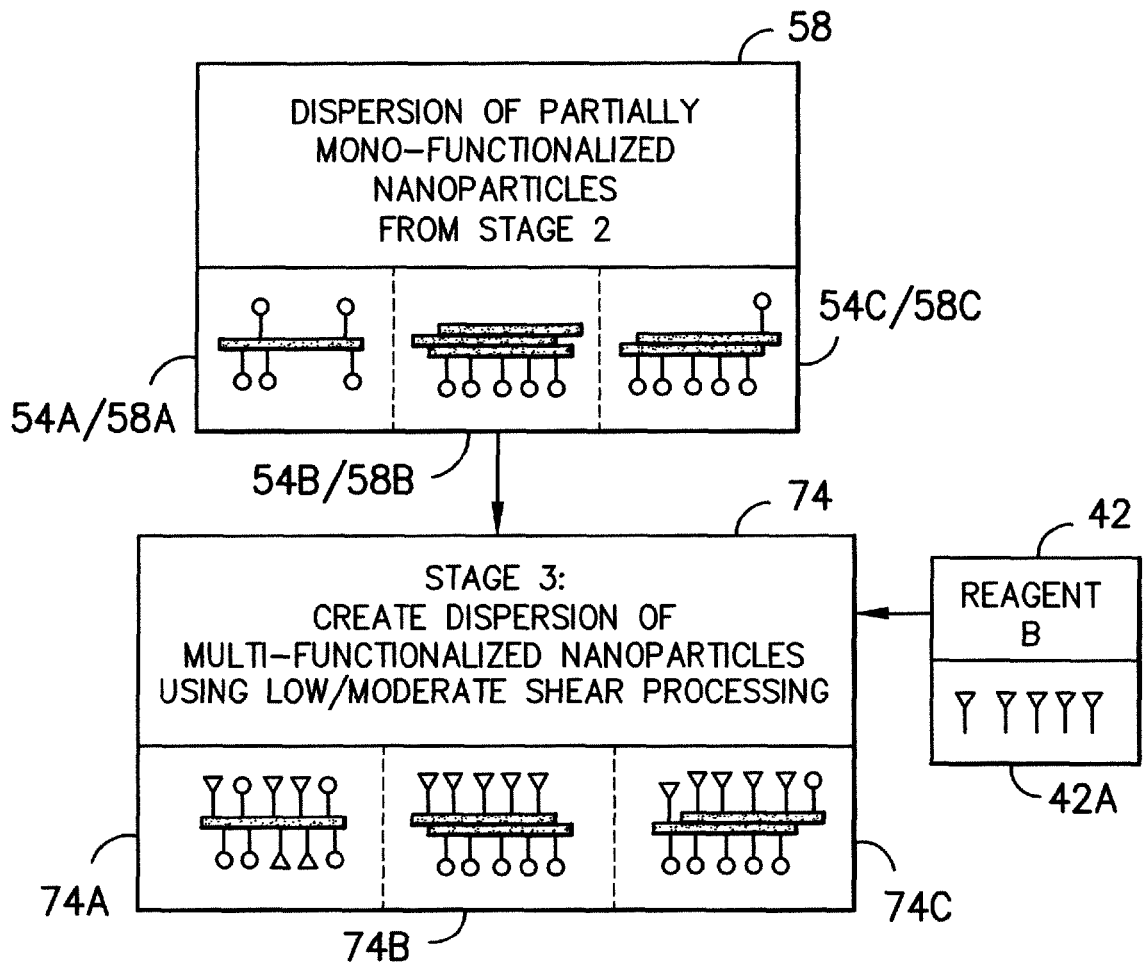
FIG. -4B-

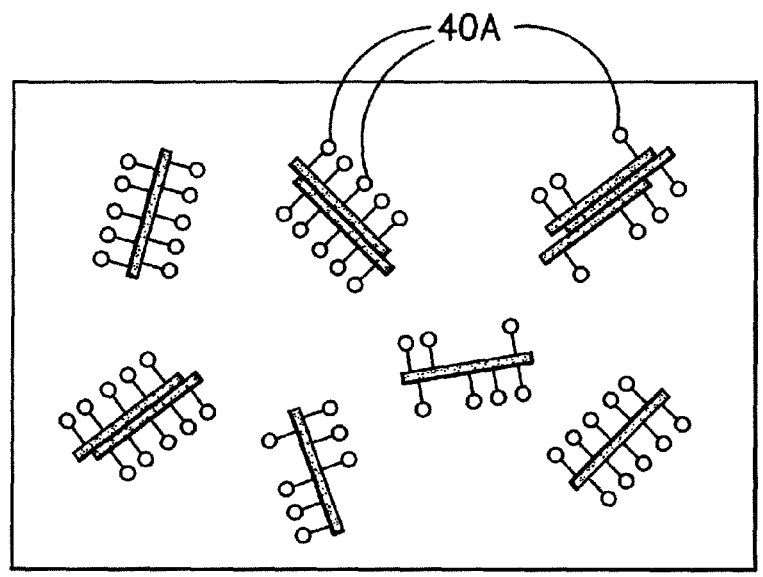
FIG. -5-
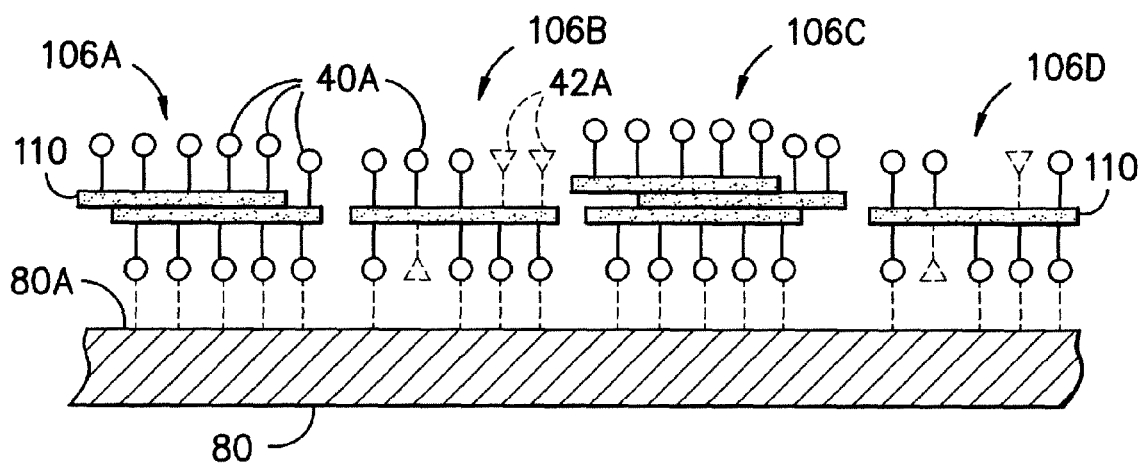
FIG. -6-

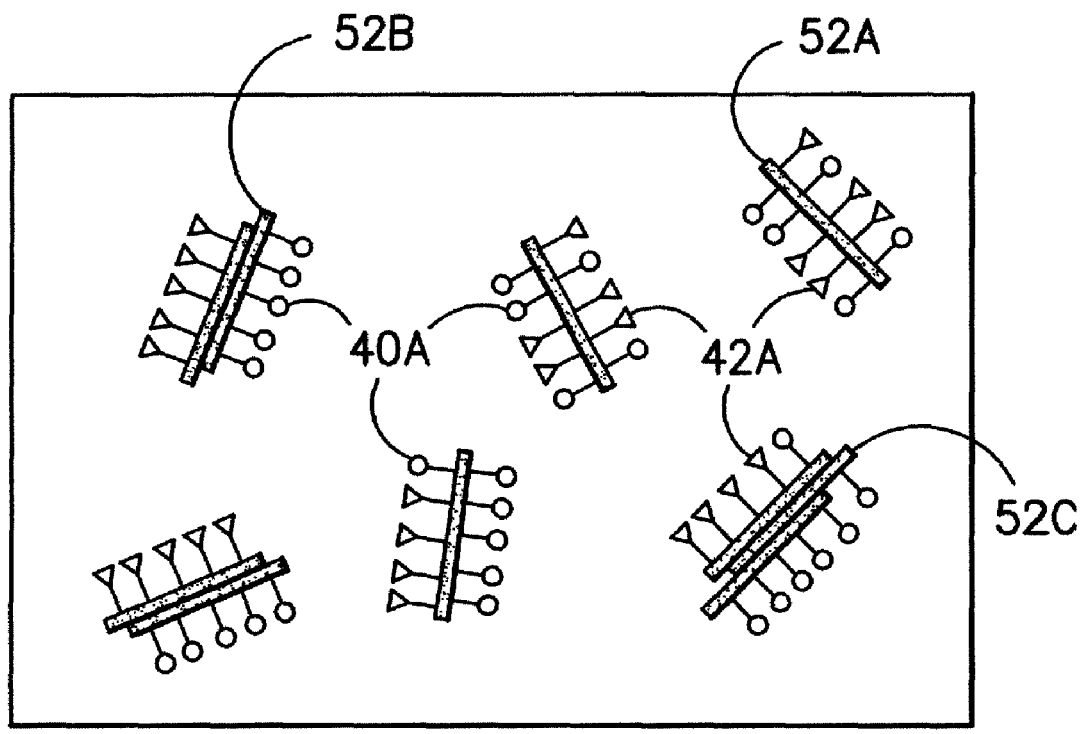
FIG. -7-

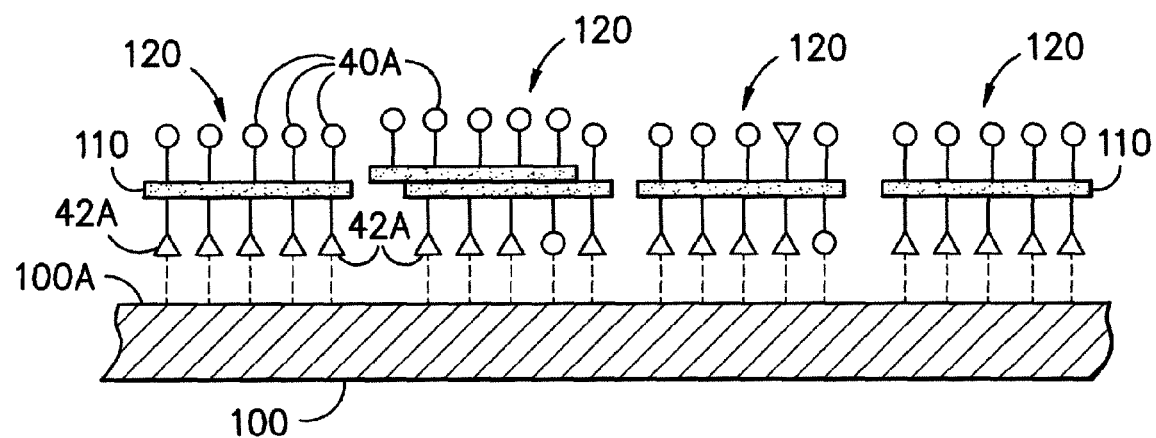
FIG. -8-
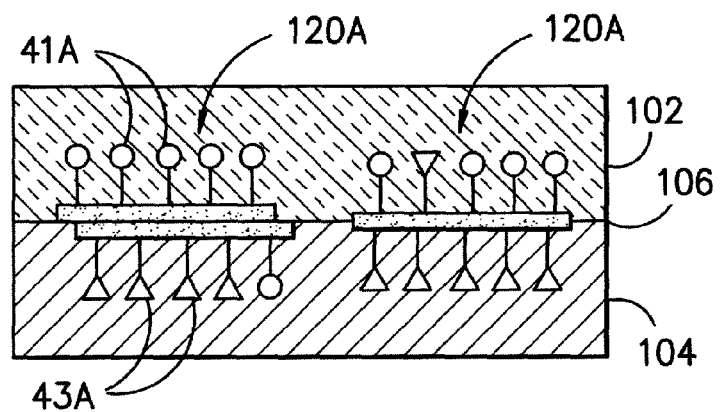
FIG. -9-

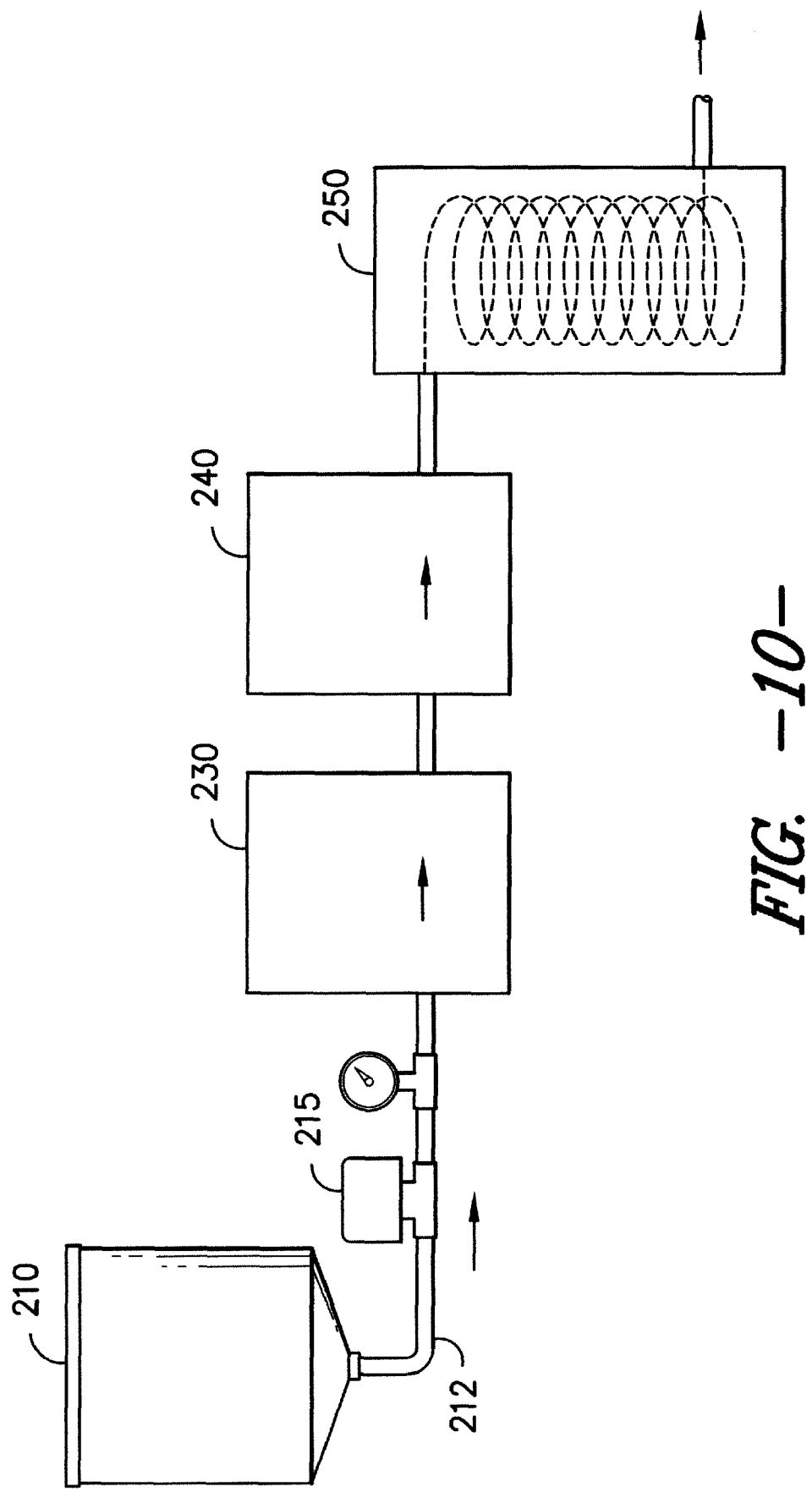
FIG. -10-

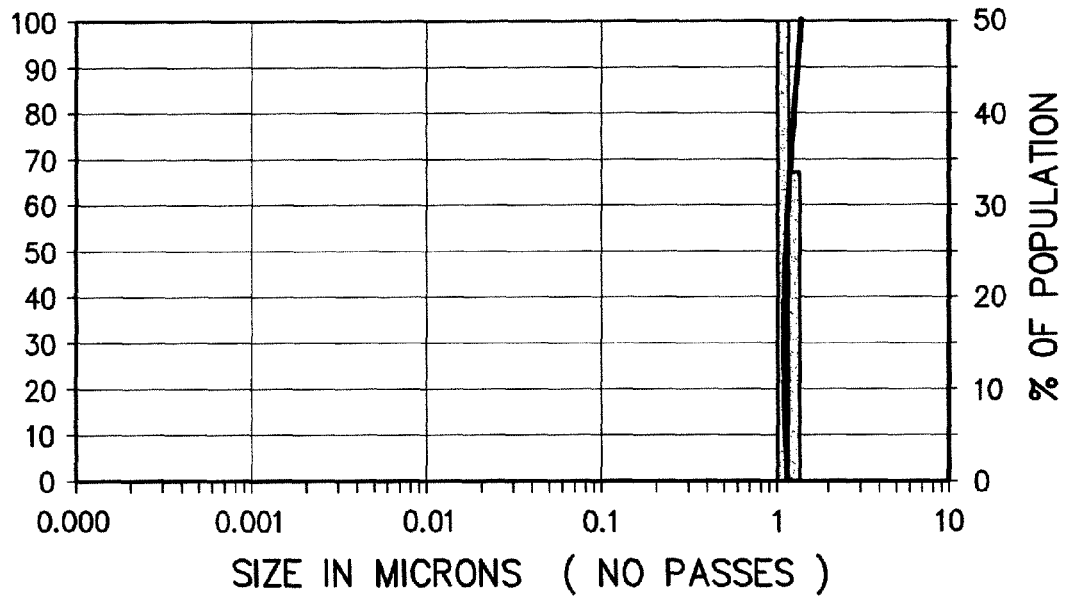
FIG. -11A-
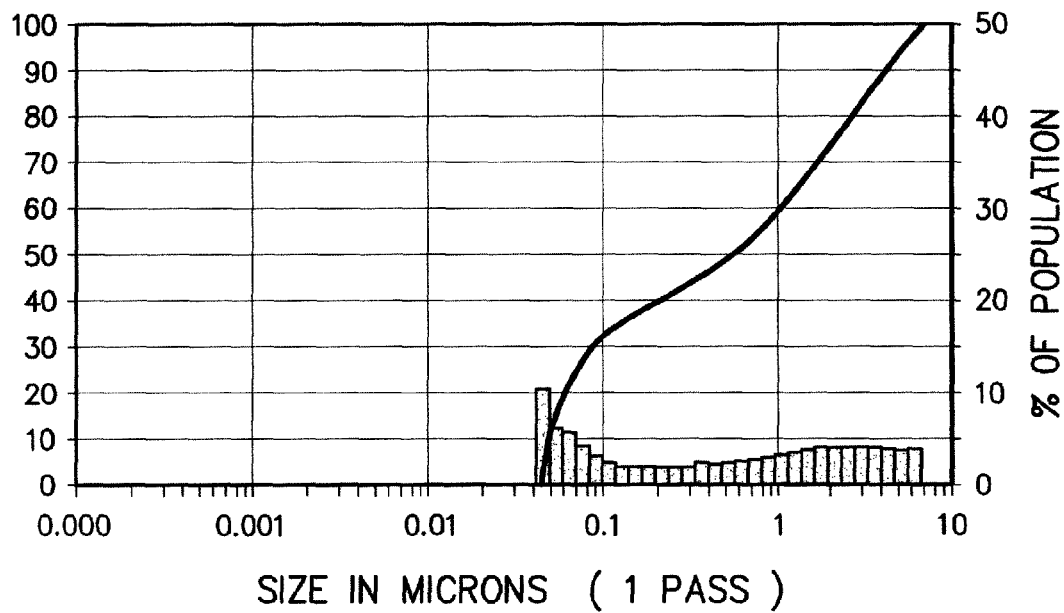
FIG. -11B-

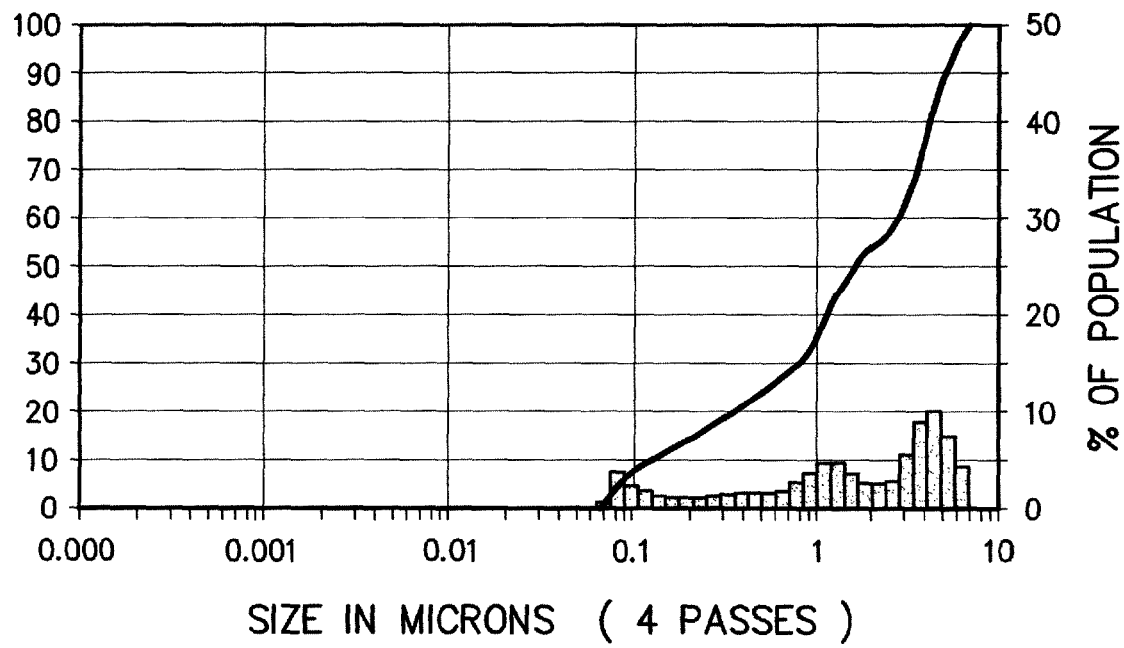
FIG. -11C-
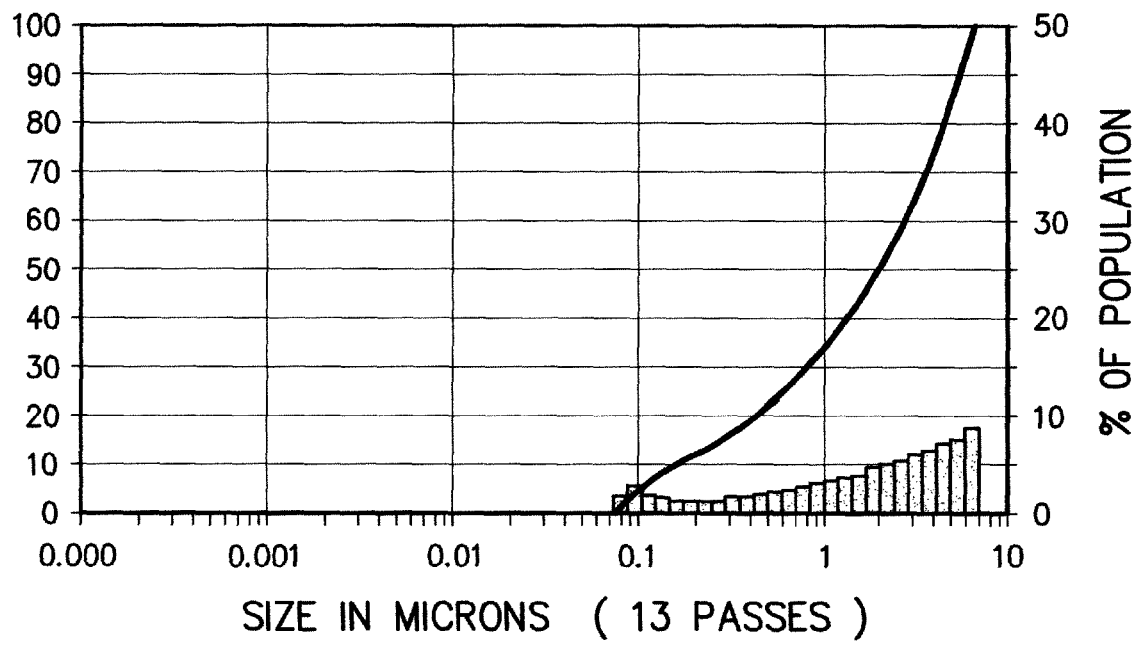
FIG. -11D-

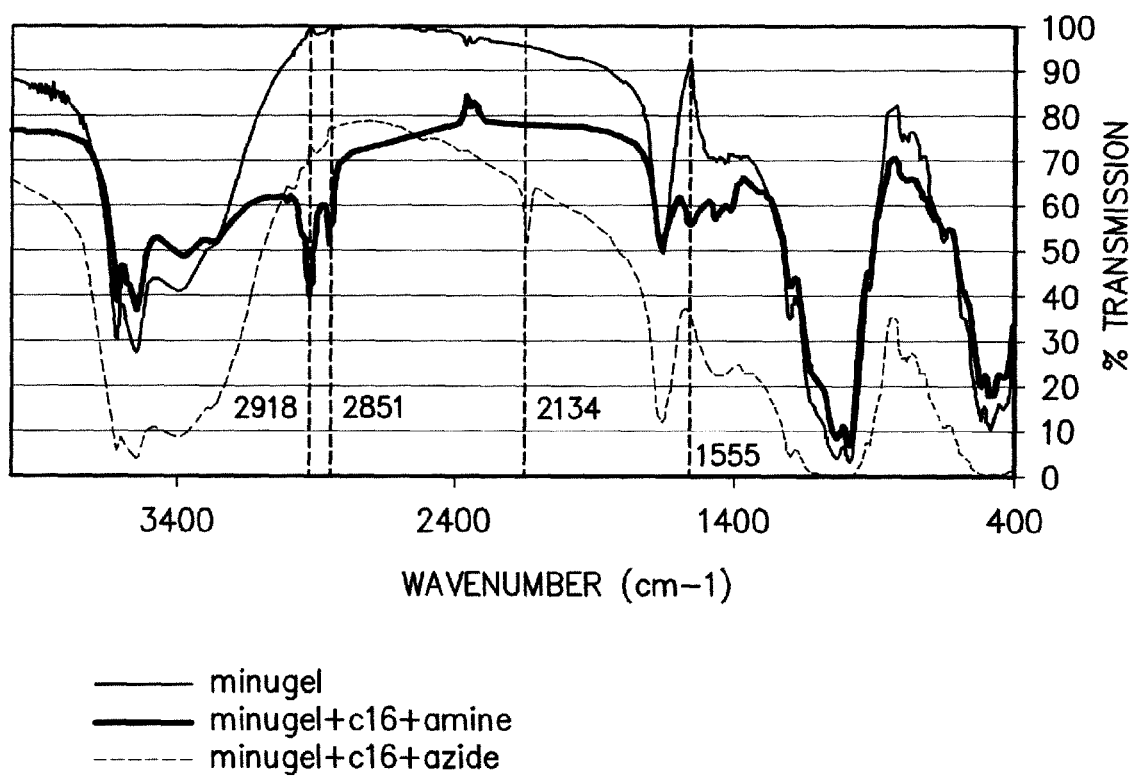
FIG. -12-

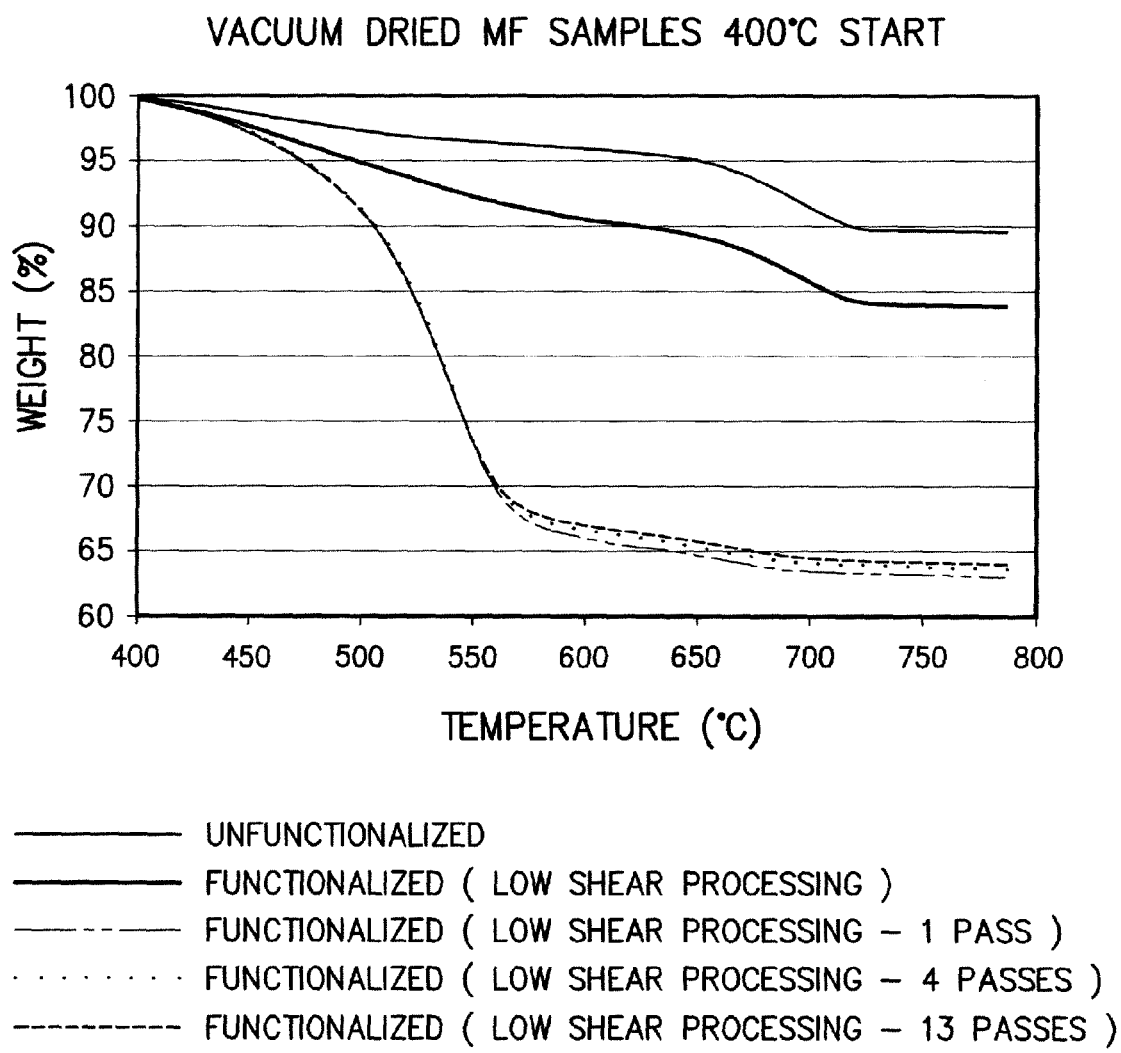
FIG. -13-

FUNCTIONALIZED NANOPARTICLES AND THEIR USE IN PARTICLE/BULK MATERIAL SYSTEMS

RELATED APPLICATIONS

This application is a Continuation-In-Part of U.S. application Ser. No. 11/726,578, filed Mar. 22, 2007, which is incorporated herein by reference.

FIELD OF TECHNOLOGY

This disclosure is directed to a process for creating readily or highly dispersible nanoparticles on which chemically reactive functional groups or ligands have been placed. In particular, this disclosure is directed to the use of an ultra-high shear fluidic processor to change the size distribution of nanoparticle agglomerations and facilitate the formation of stable dispersions of such nanoparticles, as well as the placement of various chemically reactive functional groups or ligands on exposed surface areas of such nanoparticles. In accordance with the teachings herein, such functionalized nanoparticle agglomerations have a broader size distribution (with a substantial increase in the proportion of smaller agglomerations), can exhibit enhanced dispersion characteristics and, when dispersed in various bulk materials, can impart to such bulk materials the desirable physical or chemical properties associated with the selected chemically active functional groups that have been attached to the surface areas of such agglomerations.

DEFINITIONS

As used herein, the term "base particle" shall refer to an individual, completely un-agglomerated particle, and the term "unprocessed agglomeration size" shall refer to the average (mean) size of nanoparticle agglomerations prior to any of the de-agglomerating processing described herein. Nanoscale particles or "nanoparticles" are distinct from micron-scale particles, and shall refer to base particles or agglomerations of base particles in which a majority of the individual base particles or particle agglomerations have at least one dimension less than about 500 nanometers. For descriptive ease, the term "nanoparticle" and its derivatives shall refer interchangeably to either base particles or agglomerations, or to a mixture of base particles and agglomerations of base particles, except where context or the express use of the word "agglomeration" dictates a distinction. Also for descriptive ease in the following discussions, the term "micro-agglomeration" and its derivatives may be used qualitatively to describe groups or sub-groups of agglomerated nanoparticles in which most of the agglomerations are smaller than the unprocessed agglomeration size, and the term "macro-agglomeration" and its derivatives may be used as a qualitative reference to groups or sub-groups of agglomerated nanoparticles in which most of the agglomerations are larger than the unprocessed agglomeration size.

Mono-functionalized particles shall refer to nanoparticles or agglomerations of nanoparticles onto which functional groups of a single type have been chemically bound. Multi-functionalized particles shall refer to nanoparticles or agglomerations of nanoparticles onto which at least two, and perhaps three or more, different types of functional groups have been chemically bound. Unless otherwise specified, the term "functionalized nanoparticles" will be used to describe either mono- or multi-functionalized nanoparticles.

The term "bulk material" shall be used to describe the medium or matrix into which such functionalized particles are dispersed. Although it is intended that any suitable bulk material be used in connection with the teachings herein, polymeric bulk materials are believed to be particularly adapted for such use. Where the bulk material is essentially comprised of a single substance or a solution of substances throughout (ignoring any dispersed nanoparticles), the material will be referred to as homogeneous material. Where the bulk material is comprised of two or more discrete, dissimilar materials separated by one or more boundaries or interfaces (including, but not limited to, millimeter-scale or smaller dispersions of one material within another), that material will be referred to as heterogeneous material.

Ultra-high shear fluidic processing—sometimes referred to herein simply as high shear mixing or processing—of agglomerated nanoparticles comprises a process by which some combination of high shear forces and particle collisions are introduced by means of an application of kinetic energy to an agglomeration/solvent system, either through pressurized, turbulent hydrodynamic flow (e.g., flow having a Reynolds number Re greater than about 2000) or some other physical means, thereby reconfiguring the topology of individual agglomerations, exposing previously unexposed surface areas on or within individual nanoparticles and increasing, at least initially, the relative proportion of particle agglomerations smaller than the unprocessed agglomeration size. (As will be discussed later, repeated ultra-high shear fluidic processing can ultimately cause a decrease in the relative proportion of such smaller particle agglomerations.) Proper optimization of the ultra-high shear fluidic processing, as understood by those skilled in the art, is necessary to achieve the optimum particle size distribution in various systems. Where such processing includes the introduction of a reagent, such processing is also thought to enhance the transfer and attachment of functional groups from the reagent onto the exposed surfaces on or within the nanoparticles. One non-limiting example of commercially available equipment for ultra-high shear fluidic processing is the Microfluidizer® line of equipment marketed by the Microfluidics Corporation of Newton, Mass.

BACKGROUND

Traditional microcomposites are comprised of micron-scale particles in an otherwise homogeneous bulk material matrix. Because of their size, such particles generally provide relatively small surface areas compared with their volume, which limits the extent to which the particle can take advantage of interfacial interactions with the matrix in which it is embedded, and, in some cases, tends to impede the uniform distribution of the particles throughout the bulk material. Decreasing the size of the particles used in such composites to nano-scale can result in the formation of composites ("nanocomposites") in which the nano-scale particles exhibit an enhanced ability to interact with the bulk material and to disperse more uniformly within (or over the surface of) the material.

As such particles become smaller, the ratio of surface area to volume increases, which means any effects or properties associated with the surface of such particles tend to become more dominant. When such nano-scale particles are well dispersed within a bulk material, the effects or properties broadly associated with the interface between the particles and the bulk material—including any functional groups that populate or are chemically attached to the particle surface—may significantly modify the characteristics associated with that bulk material to an extent not usually encountered with micron-scale particles. Processes for achieving the effective dispersion of such particles can include melt-blending (e.g., with an extruder), solvent blending, in-situ polymerization, or solid phase blending such as milling or pulverization such as taught in U.S. Pat. No. 6,180,685 to Khait, et al., the teachings of which are hereby incorporated by reference.

Agglomerations of nanoparticles typically are characterized by having pre-existing surface areas, i.e., those exposed surfaces that are associated with the external topology of the agglomeration, and the potential for having newly or freshly exposed surface areas, i.e., those surfaces that become exposed as a result of the mechanical break-up or rearrangement of the agglomeration, as, for example, occurs in accordance with the ultra-high shear fluidic processing described herein.

The teachings herein are directed in part to the formation of nanoparticle dispersions in a selected solvent wherein at least some of the agglomerations of nanoparticles have been structurally modified (e.g., changed in size, shape, or surface topography), and thereby have been given newly or freshly exposed surface areas onto which functional groups have been placed. Optionally, such nanoparticle/solvent dispersions or the nanoparticles obtained from such dispersions can be incorporated into bulk materials to form nanoparticle/bulk material dispersions in which the properties associated with the functionalized nanoparticles are effectively imparted to the bulk material, either throughout the material or in localized areas such as along a surface or boundary of the material.

If multi-functional nanoparticles are created and introduced within an appropriate heterogeneous composite, and each of the functional groups contributing to the multi-functionality of the particles are respectively compatible with only one or the other of the two dissimilar materials comprising the heterogeneous composite, then the particles typically will tend to concentrate or align themselves along the interface between the dissimilar materials, with particle orientation being largely dictated by the compatibility of the individual functional group with the constituent bulk material with which it is in contact. In such cases, this alignment can be facilitated where the various functional groups populating the nanoparticles surface are segregated or concentrated on specific areas or sides of the nanoparticles.

Such segregation, even if relative or partial, can facilitate the relative physical orientation of the particle with respect to the interface and, by implication, the degree to which the functionality associated with the functional groups on the particle is expressed or observed. This effect can be advantageous in many situations, e.g., where the functionality contributes desirable adhesion or bonding between the two dissimilar materials forming the interface, or where the interaction between the two dissimilar materials is to be impeded or otherwise controlled.

In the discussion that follows, it shall be assumed that the bulk material used is polymeric in nature. It should be understood that other, non-polymeric bulk materials such as suitable organic liquids may also be used in connection with the teachings herein (thus giving rise to interfaces that are solid/liquid or liquid/liquid in nature), with appropriate modifications with respect to dispersion techniques and functional groups that would be apparent to those skilled in the art.

BRIEF DESCRIPTION OF DRAWINGS

FIG. 1 depicts, in high level flow chart form, a series of three process steps, two of which are individually optional, by which agglomerated nanoparticles, which are shown (for convenience only) as having a high length-to-thickness ratio and perhaps having a relatively narrow size distribution, can be processed to form functionalized nanoparticles with a broader agglomerated size distribution and, optionally, to form dispersions of such particles within bulk materials. The processes are defined as "Stage 1" (indicating processing done prior to high shear processing), "Stage 2" (indicating high shear processing), and "Stage 3" (indicating processing done following high shear processing). The incorporation of the results of any such Step 2 processing (with or without optional Stage 1 and/or Stage 3 processing) is depicted as a separate step following optional Stage 3.

FIG. 2 depicts an exemplary embodiment of Stage 1 processing, as depicted in FIG. 1.

FIGS. 3A through 3E depict exemplary embodiments of Stage 2 processing, as depicted in FIG. 1, including optional Stage 3 processing.

FIGS. 4A and 4B depict exemplary embodiments of Stage 3 processing, as depicted in FIG. 1.

FIG. 5 depicts, in schematic form, an embodiment of a nanoparticle/bulk material dispersion in which individual mono-functionalized nanoparticles have been dispersed substantially uniformly within and throughout a portion of a homogeneous material.

FIG. 6 depicts, in schematic form, one embodiment of a nanoparticle/bulk material dispersion in which a plurality of individual mono-functionalized nanoparticles (functionalized via functional groups 40A) are shown preferentially oriented on the surface of a homogeneous material. Also depicted (with broken lines to indicate their optional status) is the representative presence of optional dissimilar functional groups 42A on certain nanoparticles that could provide additional functionality if present in sufficient numbers.

FIG. 7 depicts an embodiment of a nanoparticle/bulk material dispersion in which a plurality of individual multi-functionalized nanoparticles (functionalized via functional groups 40A and 42A) is dispersed substantially uniformly within and throughout a significant portion of a homogeneous material.

FIG. 8 depicts an embodiment of a nanoparticle/bulk material dispersion, somewhat similar to the dispersion of FIG. 6, comprising a plurality of individual elongate multi-functionalized nanoparticles, in which the population of respective functional groups are substantially segregated, with each nanoparticle having sides with different functionalities (via functional groups 40A, 42A) and are shown preferentially oriented on the surface of a bulk material. Although not shown, the degree of segregation of functional groups could be less than total (as shown).

FIG. 9 depicts an embodiment of a nanoparticle/bulk material dispersion in which two individual multi-functionalized nanoparticles having substantially segregated functional groups are shown preferentially oriented along an interface or boundary within a heterogeneous material, with each respective functional surface of the particle associated with its own side of the boundary. This can be thought of as an alternative embodiment to the embodiment of FIG. 8, except that the surface along which the nanoparticles are deployed is formed by the boundary or interface between two different bulk materials.

FIG. 10 schematically depicts an exemplary ultra-high shear fluidic processor which can be used in a process to modify the size, shape, and/or surface topography of nanoparticle agglomerations, thereby creating exposed surface sites for the attachment of chemically active functional groups in accordance with the teachings herein.

FIGS. 11A through 11D show the effects of multiple passes through an ultra-high shear fluidic processor, such as that depicted in FIG. 10, on particle size distributions of attapulgite in hexane. As depicted: before any high shear processing (i.e., before any processing whatsoever) (FIG. 11A), after 1 pass (FIG. 11B), after 4 passes (FIG. 11C), and after 13 passes (FIG. 11D). This series shows the progression from agglomerated nanoparticles of nearly identical size, through the creation of a majority number of micro-agglomerations within the agglomeration population and, with repeated ultra-high shear processing, the creation of a majority number of macro-agglomerations within the agglomeration population, for a specific type of nanoparticle (attapulgite) in a specific processing environment.

FIG. 12 depicts a transmission IR spectrum of multi-functionalized attapulgite nanoparticles which have been provided with two functional groups, in accordance with the teachings herein.

FIG. 13 depicts the results of a thermogravimetric analysis ("TGA") of unprocessed and unfunctionalized attapulgite, as well as following functionalization with an organo-trimethoxysilane using low shear mixing (e.g., vigorous stirring in a beaker), and following functionalization with an organo-trimethoxysilane after four and thirteen passes through an ultra-high shear process.

DETAILED DESCRIPTION OF EXEMPLARY EMBODIMENTS

Stage 1 Processing

An embodiment of the overall process described herein is shown, in simplified form, in FIG. 1. As depicted, a quantity of agglomerated nanoparticles 10 (schematically depicted at 10A) is, optionally, subjected to a low-to-moderate shear mixing process 2 (such as slow to moderate speed stirring in a beaker for several minutes or hours) in the presence of a reagent in what is referred to as "Stage 1" processing. During such Stage 1 processing, optional mechanical action imparted to the agglomerated nanoparticles may tend to broaden the size distribution of the agglomerations, and in doing so increases the relative proportion of micro-agglomerations (and, coincidentally, of macro-agglomerations as well, at least with certain nanoparticles) within the nanoparticle population. This action may create newly-exposed surface areas on or within the processed nanoparticle agglomerations that provide potential attachment sites for functional groups supplied by the reagent. Pre-existing surface areas on the nanoparticle agglomerations may also provide attachment sites for such functional groups.

FIG. 2 provides a schematicized process diagram of one representative embodiment of a Stage 1 process. As shown, the unprocessed agglomerated particles 10 (highly schematically depicted at 10A) are subjected to low-to-moderate shear mixing (e.g., moderate speed mixing or vigorous agitation over several minutes or hours) in an environment that includes an appropriate solvent 30 and an appropriate reagent 40 ("Reagent A"), a source of the "lollipop" chemical functional groups depicted at 40A. One result of this extended-mixing-with-reagent is depicted at 20A—the creation of significant numbers of micro-agglomerations (and a corresponding increase in newly exposed surfaces on or within such smaller agglomerations), and the attachment of such surfaces of the "lollipop" functional groups from reagent A. These nanoparticle agglomerations can be thought of as being partially functionalized in several senses—not only do the agglomerations remain large, with many unexposed potential functional group attachment sites, but, in some cases, already-exposed sites may not be fully populated with functional groups.

Following optional removal of excess Reagent A (as, for example, when a different reagent is to be used during subsequent processing), the partially functionalized nanoparticles are ready for Stage 2 processing, described in further detail below. Immediately following Stage 1 processing, the functionalized agglomerates may or may not be capable of forming a stable suspension in solvent 30, but do exhibit some properties contributed by the functional groups from Reagent A. It is thought that the agglomeration size distribution from this Stage 1 process is relatively narrow and centered generally near the unprocessed agglomeration size.

Stage 2 Processing

The process depicted at 4 in FIG. 1, referred to as Stage 2 processing, is comprised of ultra-high shear mixing of agglomerated nanoparticles, and can be undertaken with or without the benefit of Stage 1 processing. The results of Stage 2 processing are primarily a modification of the agglomeration size profile of the nanoparticles and the generation of previously unexposed surfaces on or within the variously-sized nanoparticle agglomerations. These newly exposed surfaces can provide reaction sites for functional groups provided by a reagent, which may be present during Stage 2 processing or introduced later. Stage 2 processing also dramatically increases, at least initially, the number and relative proportion of micro-agglomerations within the nanoparticle population. (As discussed elsewhere, the ultra-high shear mixing process can, if prolonged or repeated, tend to re-agglomerate a substantial portion of the nanoparticle population, at least in some cases.)

Options associated with Stage 2 processing include (1) adding a reagent, thereby promoting the attachment of functional groups from the selected reagent onto the existing and/or newly exposed surfaces of the nanoparticles (as opposed to simply using the Stage 2 processing to generate newly exposed surfaces to be populated by functional groups in a subsequent step), and (2) making multiple passes through the ultra-high shear processor multiple times (see path 5 in FIG. 1) to expose previously un-exposed surface areas on or within the agglomerations of nanoparticles, thereby providing fresh potential functional group attachment sites. The result of Stage 2 processing may be ultra-finely comminuted non-functionalized nanoparticles—if Stage 1 was not included and no reagent was introduced during Stage 2 processing—or may be ultra-finely comminuted nanoparticles to which functional groups have been attached, either through previous Stage 1 processing or the use of a reagent in Stage 2, or both. Where the same reagent is used in both Stage 1 and Stage 2 processing, the expected result is the formation of a suspension of nanoparticles in the selected solvent that is both more highly stable (e.g., less inclined to separate) and that exhibits the functionality contributed by the functional groups from Reagent A to a relatively high degree.

It is contemplated that different respective reagents (e.g., Reagent A and/or Reagent B, individually or in combination) could be used for Stage 1 and Stage 2 processing, thereby yielding multi-functional nanoparticle agglomerations. It is also contemplated that the use of different reagents can result in the formation of highly segregated attachment sites (rather than having the functional groups be somewhat randomly distributed over the particle surface), such that the presence of the functional groups provided by the reagents are largely grouped by type upon the particle surface. In either case (i.e., segregated or random), the result is the formation of a nanoparticle that exhibits functionality contributed by both of the reagents used. In addition, a third chemically function group may be added at different points in the process to form a multi-functionalized nanoparticle where the first, second, and third chemically functional groups are substantially segregated on the surface of the nanoparticle. In another embodiment, the first chemically functional group is segregated from the second and third chemically functional groups on the surface of the nanoparticle.

FIGS. 3A through 3E depict various representative embodiments of Stage 2 processing, all of which include, as a common element, use of an ultra-high shear processor to expose previously unexposed nanoparticle agglomeration surfaces and allow those surfaces to be brought into contact with one or more reagents and/or chemically active functional groups, either as part of, or following, Stage 2 processing.

In FIG. 3A, unprocessed (i.e., not subjected to Stage 1 treatment) agglomerated nanoparticles 10, 10A, solvent 30 and reagent 40 (Reagent A), to which functional groups 40A are associated, are combined and subjected to an ultra-high shear mixing step 50. FIGS. 50A through 50C depict, in highly generalized and schematicized form, three of the many possible particle configurations possible from this Stage 2 treatment. In FIGS. 50A and 50B, small agglomerations of nanoparticles carry functional groups 40A from Reagent A, while in FIG. 50C, a single base nanoparticle is shown, also carrying "lollipop" functional groups 40A from Reagent A.

If the concentration of functional groups associated with the nanoparticles is deemed insufficient, the output of this step 50 can be re-cycled via path 60, perhaps with additional Reagent A, until the degree of functionality imparted by Reagent A (as measured by, for example, the ratio of (1) the weight of the functional groups attached to the nanoparticles to (2) the total weight of the nanoparticles) is satisfactory. The resulting dispersion of particles may then be passed on for optional Stage 3 processing, indicated at 70. It should be noted that, for convenience, the functionalized nanoparticles have been depicted as being fully populated by functional groups (i.e., all exposed surfaces carrying functional groups). These nanoparticles are not necessarily fully populated, and may, in fact, contain exposed surfaces having a significant number of empty sites to which functional groups may become attached in subsequent reactions.

In FIG. 3B, the starting material 14 is comprised of mono-functionalized nanoparticle agglomerations (schematically depicted at 14A), perhaps as created during a Stage 1 process. These particles are combined with solvent 30 and reagent 40 (Reagent A), and the resultant dispersion is subjected to ultra-high shear mixing, as indicated at 50. The result is depicted in highly schematicized and generalized FIGS. 50A through 50C as comprising elongate base particles (depicted at 50A) as well as slightly or mildly agglomerated particles, as schematically indicated at 50B and 50C by the offset stacking of small groups of elongate particles. The corresponding suspension in the selected solvent is likely to be both more highly stable (e.g., less inclined to separate) and more capable of exhibiting the functionality contributed by the functional groups from Reagent A than the starting material 14.

As before, if the concentration of functional groups associated with the nanoparticles is deemed insufficient, the output of this step 50 can be re-cycled via path 60, perhaps with additional Reagent A, until sufficient freshly exposed surfaces are created and populated with functional groups and the degree of functionality imparted by Reagent A is satisfactory. If different functionality is desired (in addition to that provided by Reagent A), the mono-functionalized nanoparticles resulting from single or multiple passes through step 30 of FIG. 3B may then be subjected to Stage 3 processing, indicated at 70 and discussed in detail below. Implicit in these Figures and explicitly shown in FIGS. 3C and 3E) is the alternative of introducing two or more reagents during the same high shear processing step, either by combing the reagents and introducing them as a mixture (e.g., as a bi- or multi-component "Reagent A"), or using some phased approach if dictated by compatibility or relative reactivity considerations.

In FIG. 3C, the starting material is again comprised of mono-functionalized nanoparticles, created, for example, during a Stage 1 process, to which functional groups from Reagent A are attached. In this case, excess Reagent A is optionally removed, and the nanoparticles are combined with a different reagent 42 (Reagent B, providing functional groups 42A) and a compatible solvent 32, and the resultant dispersion is subjected to ultra-high shear mixing, indicated at 52. FIGS. 52A through 52C schematically depict representative examples of the output of Step 52, in which the nanoparticles (a base particle is depicted in FIG. 52A) each show a mixture of functional groups from Reagent A (depicted as "lollipops" or stalks with circles) and from Reagent B (depicted as "flags" or stalks with triangles).

As suggested above, if the concentration of functional groups associated with the nanoparticles is deemed insufficient, the output of this Step 52 can be re-cycled, perhaps with additional Reagent B, until sufficient freshly exposed surfaces are created and populated with functional groups and the degree of functionality imparted by the selected reagent is satisfactory. Successive recycling passes (via path 60) through Step 52 in the presence of either Reagent A or Reagent B (or a combination of both) is contemplated, the number of passes and choice of reagent(s) (as well as the sequence of delivery of the chosen reagent(s)) being dependent upon the desired level of the respective reagent-induced properties that the nanoparticles (and, ultimately, the nanoparticle/bulk material dispersions) are intended to exhibit, and the chemical compatibility and reactivity of the various reagents and/or solvents.

FIG. 3D depicts a situation in which the Stage 2 processing is used to modify the agglomeration size profile of the nanoparticles and provide newly exposed reaction site surfaces, as before, but without the addition of a reagent. As depicted, excess Reagent A from Stage 1 processing is optionally removed at 16, and the nanoparticles are then subjected, perhaps repeatedly (via path 60), to Stage 2 processing 54 in the absence of a reagent. As indicated at 54A-54C, this results, at least in part, in finely comminuted nanoparticles with newly exposed (and at least partially empty) potential functional group attachment sites. The ultra-finely comminuted nanoparticles are then (optionally) passed on to Stage 3 processing, discussed below. Although shown as starting with functionalized nanoparticles from Stage 1 processing, it is contemplated that Stage 1 processing may be optional, and the process of FIG. 3D may comprise only the use or repeated use of Stage 2 processing on non-functionalized nanoparticles in the absence of a reagent, with functionalization occurring during Stage 3 processing.

As depicted in FIG. 3E, the introduction of a second reagent (Reagent B) can be delayed until after the solvent/particle mixture, already treated with Reagent A, is processed at least once by the ultra-high shear fluidic processor, which further breaks up partially agglomerated nanoparticles and exposes new particle surfaces to which chemically active functional groups can attach. The dispersion resulting from the first pass through the fluidic processor may then be treated with Reagent B either as part of subsequent Stage 3 processing under conditions of low to moderate shear mixing or vigorous agitation (depicted at Step 74 of FIG. 4B) or, alternatively, re-processed in the ultra-high shear fluidic processor as part of extended Stage 2 processing in the presence of Reagent B. This latter alternative step is depicted by the introduction of Reagent B (shown at 42) along path 60, with associated functional groups 42A being depicted on the nanoparticles by the dotted flags in 56A through 56C. The result in either case (i.e., recycling through Step 56 or utilizing Stage 3 processing, using Reagent B in either case) is the attachment of functional groups associated with Reagent B to freshly exposed surface areas on the nanoparticles.

While use of an ultra-high shear fluidic processor is recited, it is believed that the use of any means by which the distribution of particle sizes within a previously agglomerated or partially agglomerated system of nanoparticles can be similarly shifted and spread should be considered part of the teachings herein. However, use of an ultra-high shear fluidic processor of the kind discussed herein has yielded superior results to, say, those obtained using conventional sonication techniques, and therefore should be considered a preferred embodiment.

Stage 3 Processing

Stage 3 processing, depicted at 6 in FIG. 1 and involving low-to-moderate shear mixing or vigorous agitation and relatively modest production of newly exposed agglomerate surfaces, is intended to follow Stage 2 processing (i.e., ultra-high shear mixing) primarily as a means by which functional groups can be introduced to potential attachment sites previously exposed but unpopulated during Stage 2 processing. Where reagent has been introduced during Stage 1 or Stage 2 processing, the addition of functional groups in Stage 3 serves to (1) enhance the concentration of functional groups previously introduced or (2) introduce and attach a different functional group to newly exposed surfaces on or within the nanoparticles. Non-limiting examples of these two embodiments are depicted FIGS. 4A and 4B.

In FIG. 4A, partially mono-functionalized nanoparticles 58 from Stage 2 processing (perhaps the result of the removal of excess reagent following Stage 1 processing and the effects of single or multiple passes of Stage 2 processing in the absence of additional reagent, such as the nanoparticles shown at 54A through 54C in FIG. 3D) are subjected to low-to-moderate shear processing 72, perhaps similar to that associated with Stage 1, in the presence of a desired reagent (in FIG. 4A, the same Reagent A already used; in FIG. 4B, a different reagent—Reagent B)). It is expected that Stage 3 processing will involve relatively modest production of newly exposed surfaces on or within nanoparticle agglomerations, and therefore the degree to which any newly introduced functional group can be incorporated into the nanoparticle agglomeration may be limited, depending upon the extent to which suitable unused or unpopulated reaction sites exist on or within the particle agglomerations, the relative affinity of the newly introduced function group to the newly exposed surfaces, and other factors. It should be noted that, in some cases, the nature and sequence of reagents introduced in the various stages can be used to encourage "replacement"—type reactions as a means to control the proportion or distribution of functional groups on the nanoparticles.

It should be noted that if several passes through the ultra-high shear processor are desired, such passes need not necessarily be performed in strict succession if some intervening processing step, such as the Stage 3 processing depicted in FIG. 1 (see step 6), is desired. Note that, via path 7 (FIG. 1), ultra-high shear processing is performed at least twice, with an intervening Stage 3 processing step used to introduce reagent and attach associated functional groups to exposed but unpopulated surfaces on the nanoparticles. The first pass through the Stage 2 process exposes fresh surfaces on which the reagent associated with Stage 3 reacts, and the second pass through the Stage 2 process, presumably in the presence of the same or a different reagent, exposes yet additional fresh surfaces to the desired reagent and its attendant functional groups.

It is contemplated that other process step arrangements could also be used. For example, it is contemplated that Reagent A and Reagent B could, if mutually compatible, be added together and allowed to functionalize the particles in a single pass (or series of passes) through the ultra-high shear fluidic processor, optionally preceded by low to moderate shear mixing, vigorous agitation, or some other means to partially break up agglomerated nanoparticles. Another example is the use of two competitive reagents, where the weakly-bound agent is selected for a temporary effect (e.g., dispersion enhancement) and a strongly-bound agent is then chosen to replace the weakly-bound agent (e.g., to impart UV stability or enhanced ionic transport), thereby imparting two or more distinct and sequential, but not necessarily co-existing, properties to the nanoparticles or (if additional Stage 2 or Stage 3 processing is possible following dispersion of the nanoparticles into the bulk material) the article in which they are dispersed.

It is believed that the nature of the properties of the bulk material into which such particles are dispersed can be affected by the general arrangement of the functional groups on the particles. Where different functional groups are intended to co-exist on the particle surface, such groups can be arranged somewhat randomly on most or all of the exposed particle surfaces or, alternatively, arranged as largely or exclusively segregated on respective surfaces of the particles. While in either case the resulting particles, and the bulk materials into which such particles are dispersed, can exhibit dual, co-existing properties, e.g., electronic conductivity and ionic conductivity, the opportunity to isolate or confine functionality to localized regions on the surface of the nanoparticles provides an even greater opportunity to fashion nanoparticle dispersions with unique properties.

For example, if the multi-functionalized nanoparticles 52A of FIG. 3C, depicted as having a mixture of functional groups on opposing sides of the nanoparticle, were deployed along a boundary between two dissimilar bulk materials, they would be expected to produce a different result within the bulk material than the nanoparticles of, say, FIG. 52B or 52C, in which the functional groups are depicted as being largely or exclusively segregated on separate sides of the nanoparticle. Multi-functionalized nanoparticles of the latter type could be positioned along interfacial boundaries as a result of competing chemical compatibilities between the functional groups associated with the nanoparticles and the respective bulk material forming the interface, and therefore may be of greater utility in heterogeneous bulk materials than particles in which the various functional groups are simply more-or-less randomly distributed over the surface of the individual nanoparticles One case where this would be preferred is the use of such particles to aid in compatibilization of immiscible polymers. For example, the formation of a composite comprising two immiscible polymers could be facilitated through the use of bi-functionalized nanoparticles wherein each of the two functional groups is compatible with one of the respective polymers.

Shown in FIG. 1 is Step 8, denoting the process in which the functionalized nanoparticles are incorporated into a selected bulk material such as a polymer. This step, not shown in detail, could be accomplished by a number of different processes known to those skilled in the art, such as in-situ polymerization, physically dispersing the functionalized nanoparticles into an uncured liquid matrix and allowing the matrix to cure while keeping the nanoparticles dispersed, or via a conventional extrusion process. FIG. 5 schematically depicts the dispersion of various mono-functionalized nanoparticles, with various agglomeration sizes and degrees of functionalization (note the presence of "empty" functional group sites on some of the depicted nanoparticles), within a bulk material such as a polymer. Where the dispersion is reasonably uniform, the functionality associated with functional groups 40A attached to the surface of individual particles may be imparted to the bulk material as a whole. As depicted, the orientation of the individual nanoparticles is random. Not shown, but contemplated, is the substitution or partial substitution of multi-functional nanoparticles for the mono-functional agglomerations depicted (e.g., with a different type of functional group occupying some or all of the "empty" functional group sites), thereby imparting different properties to the bulk material.

FIG. 6 depicts the surface 80A of a bulk material 80. Mono-functionalized nanoparticles (depicted a base particles 106B, 106D and agglomerations 106A, 106C) have been attached to surface 80A, with functional groups 40A providing the bond between the functionalized nanoparticles 106A-106D and the surface of bulk material 80A, as well as providing enhanced external properties to the surface of bulk material 80. Note that multi-functional particle 106B has been depicted with functional groups 42A shown in dashed lines, indicating the potential for such nanoparticle to provide additional functionality via the addition of functional groups 42A during the particle functionalization process. Note also that, in the interest of preserving generality, the segregation of the two different functional groups associated with the nanoparticle is depicted as incomplete (i.e., functional groups 40A and 42A occasionally appear side-by-side). It is anticipated that whenever multifunctional nanoparticles are generated, the degree of segregation of the various functional groups will vary, depending upon the specific physical and chemical environment, from a nearly random distribution of the different functional groups on the nanoparticle surface to an orderly arrangement of similar functional groups being grouped within well-defined areas—which may or may not be opposing—on the surface of the nanoparticle. The orientation of individual particles 106A-106D is shown as fixed and substantially conforming to the surface of bulk material 80.

FIG. 7 represents a multi-functional embodiment of the nanoparticle/bulk material dispersion shown in FIG. 5. Where, as here, the dispersion is reasonably uniform (as in the mono-functionalized case), the functionality associated with each of the different functional groups 40A, 42A on the surface of particles 52A-52C may be imparted to the bulk material as a whole. As depicted, the orientation of the individual nanoparticles is random. Note that nanoparticles shown in FIG. 7 are substantially similar to those depicted at 52A-52C in FIG. 3C, 56A-56C in FIG. 3E (in the latter case, after processing with Reagent B via path 60), and 74A-74C in FIG. 4B, indicating that these two sets of substantially similar multi-functionalized nanoparticles may be generated through different processes.

FIG. 8 depicts the surface of a bulk material 100, onto which multi-functionalized nanoparticles 120 have been reacted. Functional groups 40A and 42A are attached to nanoparticles 110, and the resulting nanoparticles 120 are then chemically bound to or physically adsorbed on the surface 100A of bulk material 100, with functional groups 42A providing the primary bond between nanoparticles 110 and the surface of bulk material 100, and functional groups 40A primarily providing additional or enhanced external properties to bulk material 110. As in the case of mono-functionalized nanoparticles (e.g., FIG. 6), the orientation of individual particles 110 is fixed and substantially conforms to the surface 100A of bulk material 100. Note that, similar to FIG. 6, the segregation of functional groups 40A, 42A is depicted as not necessarily complete.

FIG. 9 depicts bulk materials formed as a heterogeneous composite comprised of two discrete and dissimilar materials 102, 104 that are joined along a boundary or interface 106. The nanoparticles 120A are shown with different but substantially segregated functional groups, similar in arrangement to the functionally enhanced particles 120 of FIG. 8. Depicted in FIG. 9 is the situation in which each of those different functional groups are respectively compatible with only one or the other of the two dissimilar materials comprising the bulk material. As a result, the multi-functionalized nanoparticles 120A tend to align themselves along the interface between the dissimilar materials 102, 104, with particle orientation being dictated by the physical or chemical compatibility of the individual functional groups 41A, 43A with the constituent bulk material with which it is in contact. As in FIGS. 6 and 8, the degree of segregation of the different functional groups is substantial, but not total, as representative of the general case.

Nature of Particles and Solvents

The particles selected can have a variety of compositions and sizes, depending upon the polymer system of choice, the compatibility of the particle with that polymer system, and the ease with which the desired functionality can be imparted to the particles. Particles comprised of various silicas, aluminas, aluminosilicates, and other metallic, metal oxide, metal sulfide, metal nitride, metal carbide, or other metallic, intermetallic, or ceramic particles can be used, as can carbon nanotubes or other inherently small structures that exhibit the desired characteristics. In each case, it is recommended that the base particle size (i.e., the size of the particles in completely un-agglomerated form) for most representative particles (i.e., at least about 30% or more, and preferably at least about 50% or more, and most preferably at least about 70% or more) have at least one dimension that is less than about 500 nanometers, and preferably less than about 200 nanometers, and more preferably less than about 100 nanometers, or, alternatively, less than about 50 nanometers.

Of particular interest and utility are particles of fuller's earth, and in particular, attapulgite clay (also known as palygorskite), which is comprised of magnesium aluminosilicate and has base (i.e., un-agglomerated) particles that are generally needle shaped, with a length of approximately 3-5 microns and a width of approximately 30-50 nanometers. While such particles appear frequently in this disclosure, the teachings herein are by no means limited to particles having a specific shape or aspect ratio.

It is contemplated that the functionalization process, as well as the integration of such functionalized nanoparticles into bulk materials, can be effectively carried out with nanoparticles having a wide variety of other sizes, shapes or surface topographies—smaller or larger, regular or irregular, elongate or compact, smooth or rough. Accordingly, the size, shape, or surface topography of the particles is considered to be one of choice, dependent (among other factors) upon the nature and specific requirements of the desired properties to be imparted, the nature of the reactions through which the corresponding functionality is to be created, and the extent to which the effectiveness of the functionalized nanoparticles is dependent upon the size, shape or surface character of the nanoparticles.

Solvents may be selected from liquids that (1) will not damage equipment, either through the solvent's physical characteristics (e.g., viscosity) or the solvent's chemical characteristics (e.g., corrosivity), (2) are compatible with the desired particle and bulk material systems (e.g., will not interfere with particle travel within the ultra-high shear fluidic processor or, later, with integration into or dispersion within the desired bulk material and (3) will allow the desired functionalization reaction to proceed, e.g., will not prevent any necessary physical or chemical interaction, or promote any undesirable interaction, between the particle and the desired reagent. Solvents that have been tried with success include toluene and hexane. It is contemplated that other solvents, such as water, would also be appropriate and effective in certain physical/chemical systems.

Nature of Reagent(s)

The selection of reagent is highly dependent upon the nature of the functionalization to be imparted to the nanoparticles, the reactivity and properties of the particle being functionalized, and/or the compatibility with the selected solvent system. Suitable reagents will comprise a reactive functional group that will interact and/or react with the nanoparticle to be functionalized and, perhaps separately, a functional group that provides the desired properties. For example, compatibilization of such particles with a polyolefin can be achieved through the use of an alkyl functionality such as an n-alkyltrimethoxysilane. Other candidate reagents could include α-olefin trimethoxysilanes having double bonds available for polymerization, and perflourinated species that would have decreased surface energy. For example, trimethoxysilane can form a covalent bond on the surface of silica and/or aluminosilicate. When the trimethoxysilane complex includes a hexadecyl functional group (e.g., hexadecyltrimethoxysilane), a hydrophilic particle can be made hydrophobic, which can improve the compatibility between the particle and a hydrophobic polymer system.

In one embodiment, the first chemically functional group is hydrophilic and the second chemically functional group is hydrophobic. Some examples of pairs of groups fitting this description are alkyl groups and alkoxy groups. In another embodiment, the first chemically functional group comprises reactive sites and the second chemically functional group is inert. Examples of reactive groups include, but are not limited to alpha-olefins, phenyl chlorides, acrylates, primary amines, and sulfonyl azides and inert groups include alkyls and perfluoroalkyls. In another embodiment, the first chemically functional group has a positive charge and the second chemically functional group has a negative charge. Some examples of pairs of groups fitting this description are ammonium quaternary salts and sulfonate salts In yet another embodiment, the first chemically functional group comprises marked site and the second chemically functional group comprises unmarked site. This would be useful for fluorescent labeling of regions of high clay concentrations.

It should be understood that proper selection of solvent and reagent is complicated by the fact that the choice of solvent for the functionalization reaction(s) is constrained by the requirement that the result must not hinder or inhibit the effective integration and dispersion of the functionalized particles within the bulk material (e.g., polymer) of interest. Ineffective integration or dispersion at this step can easily result in limiting the surface area that is exposed to the solvent or limiting the distribution within the bulk material of the functionality associated with the particle surface area (thereby undesirably localizing, within the bulk material, the properties imparted by the functionalized particles).

Exemplary Processes

Shown in FIG. 10 is a schematicized diagram of an ultra-high shear fluidic processor of the kind used in the examples below (e.g., a Model M-110Y Microfluidizer® from Microfluidics Corporation of Newton, Mass.). Agglomerated nanoparticles are placed in feed hopper 210 and pumped, via conduit 212 and pump 215, to the primary interaction chamber 230, in which the fluidized nanoparticles are subjected to shearing forces. These shearing forces modify or spread the size profile of the particle agglomeration population by altering both the size and the configuration of the agglomerations, generating significant numbers of nanoparticle agglomerations that are both larger and smaller than the unprocessed agglomeration size and changing the shape and surface topology of the variously restructured agglomerations. In so doing, the shearing forces expose previously unexposed surfaces on or within the agglomerations, thereby providing potential bonding sites for functional groups to attach and "functionalize" the agglomerations. Optionally, the particles may also pass through the auxiliary processing module 240, in which another desired process, such as one allowing for continued particle/reagent interaction, may occur. Optionally, the mixture of restructured nanoparticle agglomerations and solvent may then pass through a cooling coil 250 (associated with, for example, an ice bath) to remove the considerable heat generated in the shearing process.

The process described above can be used to generate functionalized nanoparticles that are then incorporated and dispersed within a bulk material.

Example 1

Generation of Mono-Functionalized Nanoparticles

Approximately 15 grams of attapulgite (Minugel 400 or Minugel 500, from Floridin of Quincy, Fla.) was added to approximately 500 ml of hexane and an excess of hexadecyltrimethoxysilane (Reagent A) and stirred for several minutes at room temperature. The resulting mixture was then introduced into an ultra-high shear fluidic processor (Model M-110Y Microfluidizer® from Microfluidics Corporation of Newton, Mass.), and subjected to multiple "passes" through the fluidic processor. Particle size distributions prior to ultra-high shear processing, and after one, four, and thirteen passes through the ultra-high shear fluidic processor, are shown respectively in FIGS. 11A through 11D.

FIG. 13 depicts the results of thermogravimetric analyses done on nanoparticles at various stages of functionalization. These analyses confirm readily measurable functionalization taking place after low-shear processing (which may be due largely to functionalization of the existing surfaces of the nanoparticles), and dramatically increased functionalization, compared with low shear processing, after one, four, and thirteen passes through the ultra-high shear fluidic processor in the presence of a reagent (which is believed to be due to the creation of newly exposed surfaces on the nanoparticles by the ultra-high shear fluidic processor and the attachment of functional groups from the selected reagent to those surfaces).

Example 2

Generation of Multi-functionalized Nanoparticles

Particles of attapulgite were first functionalized with an excess of hexadecyltrimethoxysilane (Reagent A) by stirring for several minutes in toluene at room temperature. The clay was isolated by centrifugation, washed with hexane three times (with excess hexane being removed after each washing via centrifugation), and dried in a vacuum oven. The clay particles were dispersed in toluene and the solution was processed for 12 minutes at a pressure of approximately 14 kpsi in the ultra-high shear fluidic processor of Example 1 to create new surface areas within the nanoparticle agglomerations suitable for further reaction. Following such processing (including cooling in an ice bath), the samples in toluene were split and reacted separately with two different functional moieties: (a) 3-amino-propyltrimethoxysilane (Reagent B) and (b) 6-azidosulfonylhexyltriethoxysilane (alternative Reagent B). The multi-functionalized particle products of each such reaction were isolated by centrifugation, washed with hexane three times (with excess hexane being removed after each washing via centrifugation), and dried in a vacuum oven. The dried sample was prepared as pellets in a KBr carrier in order to conduct transmission IR spectroscopy. The spectra, as seen in FIG. 12, show the presence of the C—H stretch band (2851 $cm^{-1}$ and 2918 $cm^{-1}$) in each of the functionalized samples. Peaks at 1555 $cm^{-1}$ and 2134 $cm^{-1}$ represented the amine and azide peaks, respectively.

Example 3

Generation of Multi-functionalized Nanoparticles

Particles of attapulgite are first functionalized with an excess of hexadecyltrimethoxysilane (Reagent A) by stirring for several minutes in toluene at room temperature. The clay is isolated by centrifugation, washed with hexane three times (with excess hexane being removed after each washing via centrifugation), and dried in a vacuum oven. The mono-functionalized clay particles are then dispersed in toluene and the solution is processed for 12 minutes at a pressure of approximately 14 kpsi in the ultra-high shear fluidic processor of Example 1 in the presence of 3-amino-propyltrimethoxysilane (Reagent B). The resulting dispersion is re-processed in the ultra-high shear fluidic processor an additional twelve times in order to generate previously unexposed nanoparticle surface areas and facilitate exposure of such areas to Reagent B. Following drying in a vacuum oven, the resulting particles exhibit multi-functionality similar to that of Example 2.

Example 4

Particles of alumina are dispersed in water. The dispersion is processed in an ultra-high shear fluidic processor similar to that of Example 1 (one or more passes). An excess of polyethylene glycol capped at one end by a carboxylic acid group (e.g., $CH_3O(CH_2CH_2O)_nCH_2COOH$) is introduced after the first pass. The resulting dispersion is centrifuged to isolate the nanoparticles, followed by washing with hexane three times (with excess hexane being removed after each washing via centrifugation), and drying in a vacuum oven. The resulting alumina nanoparticles are covered with polyethylene glycol functional groups.

Example 5

Particles of attapulgite are dispersed in toluene. Hexadecyltrimethoxysilane and 3-aminopropyltrimethoxysilane are added in sub-stoichiometric amounts to the dispersion, which is then subjected to one or more passes through an ultra-high shear fluidic processor similar to that of Example 1. The resulting dispersion is centrifuged to isolate the particles, followed by washing with hexane three times (with excess hexane being removed after each washing via centrifugation), and drying in a vacuum oven. The resulting nanoparticles are randomly covered with the hexadecyl- and aminopropyl-functional groups.

Example 6

Twenty grams of aluminum oxide ($Al_2O_3$) nanoparticles were vigorously stirred in a beaker for several minutes at room temperature, using toluene as a solvent and an excess of oleic acid as a reagent (Reagent A). The resulting functionalized particles were centrifuged, washed three times with hexane (perhaps accompanied each time with centrifugation to remove excess hexane) and dried. The particles were then dispersed in 400 ml of toluene, and the mixture was then subjected to ultra-high shear processing for approximately twelve minutes. The resulting dispersion was then reacted with an excess of p-chloromethylphenyltrichlorosilane (as Reagent B) while the mixture was vigorously stirred. As a result, molecules of Reagent B, having a higher affinity for aluminum oxide than those of Reagent A, tended to substitute and displace molecules of Reagent A on the nanoparticle surfaces. This displacement was confirmed by IR spectroscopy.

Example 7

The mono-functionalized particles of Example 1 are blended into polyethylene using a twin-screw extruder at a temperature of about 190° C. The extrudate is a polymer/nanoparticle composite with average separation between particles greater than the control clay. The particle loading of the nanoparticles in the polymer ranges from about 0.1% to about 50% by weight.

Example 8

The multi-functionalized particles of Example 2 are mixed into a blend of 60% polypropylene and 40% nylon 6 and extruded using conventional extrusion techniques and equipment. The extrudate is a compatibilized polymer blend with a substantial fraction of the multi-functionalized particles residing at the interface of the two polymers. The particle loading of the nanoparticles in the polymer ranges from about 0.1% to about 50% by weight.

Example 9

Attapulgite clay (MINUGEL® 500, Floridin) was dispersed in toluene and an excess of hexadecyltrimethoxysilane while dry nitrogen was bubbled through the solution. The dispersion was stirred overnight, then washed with hexane, centrifuged and dried. The clay was then redispersed in clean toluene and passed 4 times through a Microfluidizer® in the presence of an excess of 3-mercaptotrimethoxysilane. A sample of the resulting gel was then dispersed in 500 mL of toluene, forming a dilute dispersion of multi-functional clay particles.

A 0.1M aqueous solution of $AgNO_3$ was made and 1 mL of aqueous ammonia added. This was mixed until no precipitate remained. The solution was blended into the dilute dispersion of clay particles and benzaldehyde added as a reducing agent. The solution was stirred at 35° C. for 10 minutes in order to deposit silver nanoparticles preferentially on the thiols present on the surface. A sample of this material was washed with clean toluene and then diluted further.

A drop of the further diluted dispersion was placed on a HITACHI® 7600 TEM (transmission electron microscope) grid and evaporated, leaving the particles behind for imaging. The Ag nanoparticles, due to their high Z, showed up in high contrast to the attapulgite clay. The silver particles, in general, were not in contact with other silver particles and no conductivity of the nanoparticle was detected.

In order to determine whether the silver is segregated on the surface, the following analysis was completed. For each clay particle that was well-dispersed, the clay particle itself was thresholded, manually if necessary. On the original image, the silver nanoparticles were thresholded, creating separate images containing the clay and the silver. A feature-AND operation was then used to select only the silver particles touching the clay particle of interest. This rejected silver particles that might be attached to other clay particles in the field of view. Each of these images was measured, and the centroids of each feature in both images computed, in calibrated units.

If the clay particles had highly segregated functionality, a large vector between the centroid of the clay and the centroid of the system of silver nanoparticles would be observed. If the silver were equally distributed over the surface of the clay, the centroid of the system of nanoparticles should be roughly identical to the centroid of the clay.

Because of the stochastic nature of the dual functionalization process, a distribution of these vectors should be observed. After measuring 4 clay particles, and computing the vectors, it was found that the particles in the system were consistent with having highly segregated functionality as shown in Table 1.

TABLE 1

| Particle | Vector (nm) |
|---|---|
| 1 | 33.14 |
| 2 | 19.23 |
| 3 | 80.66 |
| 4 | 76.41 |

It was determined that the multi-functional nanoparticles had first and second chemically functional groups that were substantially segregated on the surface of the particle.

What is claimed is:

1. A nanocomposite comprising multi-functionalized nanoparticles comprising:
   a clay nanoparticle;
   a first type of chemically functional group chemically bonded to at least a portion of the surface of the nanoparticle; and,
   a second type of chemically functional group chemically bonded to at least a portion of the surface of the nanoparticle, wherein the first and second chemically functional groups are substantially segregated on the surface of the nanoparticle, wherein the multi-functionalized nanoparticles are dispersed in an extrudable thermoplastic bulk material.

2. The nanocomposite of claim 1, wherein the clay is an attapulgite clay.

3. The nanocomposite of claim 1, further comprising at least two dissimilar bulk materials, wherein the multi-functionalized nanoparticles are located at the interface of the dissimilar bulk materials.

4. The nanocomposite of claim 3, wherein the dissimilar bulk materials are liquid and the multi-functionalized nanoparticles are located at the liquid/liquid interface.

5. The multi-functionalized nanoparticle of claim 1, further comprising a third type of chemically functional group chemically bonded to at least a portion of the surface of the nanoparticle, wherein the first chemically functional group is segregated from the second and third chemically functional groups on the surface of the nanoparticle.

6. The nanocomposite of claim 1, wherein the first chemically functional group comprises marked site and the second chemically functional group comprises unmarked site.

7. A multi-functionalized nanoparticle comprising:
   a nanoparticle;
   a first type of chemically functional group chemically bonded to at least a portion of the surface of the nanoparticle; and,
   a second type of chemically functional group chemically bonded to at least a portion of the surface of the nanoparticle,
   a third type of chemically functional group chemically bonded to at least a portion of the surface of the nanoparticle, wherein the first, second, and third chemically functional groups are substantially segregated on the surface of the nanoparticle.

8. A multi-functionalized nanoparticle comprising:
   a nanoparticle;
   a first type of chemically functional group chemically bonded to at least a portion of the surface of the nanoparticle; and,
   a second type of chemically functional group chemically bonded to at least a portion of the surface of the nanoparticle, wherein the first and second chemically functional groups are substantially segregated on the surface of the nanoparticle, wherein the first chemically functional group is hydrophilic and the second chemically functional group is hydrophobic.

9. A multi-functionalized nanoparticle comprising:
   a nanoparticle;
   a first type of chemically functional group chemically bonded to at least a portion of the surface of the nanoparticle; and,
   a second type of chemically functional group chemically bonded to at least a portion of the surface of the nanoparticle, wherein the first and second chemically functional groups are substantially segregated on the surface of the nanoparticle, wherein the first chemically functional group comprises reactive sites and the second chemically functional group is inert.

10. A multi-functionalized nanoparticle comprising:
    a nanoparticle;
    a first type of chemically functional group chemically bonded to at least a portion of the surface of the nanoparticle; and,
    a second type of chemically functional group chemically bonded to at least a portion of the surface of the nanoparticle, wherein the first and second chemically functional groups are substantially segregated on the surface of the nanoparticle, wherein the first chemically functional group has a positive charge and the second chemically functional group has a negative charge.

* * * * *